US012632464B2

(12) United States Patent
Wong et al.

(10) Patent No.: US 12,632,464 B2
(45) Date of Patent: May 19, 2026

(54) SYSTEMS AND METHODS FOR AI-ASSISTED GENERATION OF DATA TRANSFORMATION MAPS

(71) Applicant: Open Text Corporation, Waterloo (CA)

(72) Inventors: Robert Wong, Ontario (CA); Stephen Kin Cheung Chan, Sunnyvale, CA (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 18/915,830

(22) Filed: Oct. 15, 2024

(65) Prior Publication Data

US 2026/0105060 A1 Apr. 16, 2026

(51) Int. Cl.
*G06F 16/25* (2019.01)
*G06F 16/93* (2019.01)

(52) U.S. Cl.
CPC ............ *G06F 16/258* (2019.01); *G06F 16/93* (2019.01)

(58) Field of Classification Search
CPC ............................. G06F 16/258; G06F 16/93
See application file for complete search history.

(56) References Cited

U.S. PATENT DOCUMENTS

2003/0033437 A1* 2/2003 Fischer ................... G06F 16/84
                                                   719/310
2003/0135817 A1* 7/2003 Shear .................... G06F 16/258
                                                   715/255
2025/0005305 A1* 1/2025 Santhosh ................ G06F 40/58
2025/0217214 A1* 7/2025 Kashyap ................ G06F 40/40

* cited by examiner

*Primary Examiner* — Cheyne D Ly
(74) *Attorney, Agent, or Firm* — Sprinkle IP Law Group

(57) ABSTRACT

A computer-implemented method for artificial intelligence (AI)-assisted mapping of electronic data interchange (EDI) data to an alternative format is provided. The method comprises receiving a message implementation guideline (MIG) specifying a first data format for an electronic document for use within an EDI environment and generating a map from the MIG, the map comprising mapping rules for transforming messages formatted according to the MIG to a second data format. Generating the map comprises identifying, from the MIG, rules text of interest; generating a prompt to a large language model (LLM), the prompt including the rules text and requesting that the large language model convert the rules text to respective mapping logic; inputting the prompt to the LLM; receiving the respective mapping logic from the LLM; and adding an AI-generated mapping rule to the map, the mapping rule comprising the respective mapping logic.

15 Claims, 14 Drawing Sheets

SYSTEMS AND METHODS FOR AI-ASSISTED GENERATION OF DATA TRANSFORMATION MAPS

TECHNICAL FIELD

Embodiments of the present disclosure relate to the electronic exchange of data. Even more particularly, embodiments of the present disclosure relate to the automated generation of data transformation maps.

BACKGROUND

Various technologies enable the electronic exchange of documents between entities. Electronic Data Interchange (EDI) technologies, for example, allow the electronic interchange of structured data between independent computer systems in a standardized format. Common EDI standards include the United Nations rules for Electronic Data Interchange for Administration, Commerce and Transport (UN/EDIFACT), American National Standards Accredited Standards Committee X12 (ANSI ASC X12), standards among others.

Entities often use different data formats for similar documents, such as invoices, when exchanging documents electronically. To ensure smooth information exchange, entities publish data specifications specifying data formats that define the structure and content of documents used by the entities. In EDI environments, specifications may be provided as message implementation guidelines (MIGs), which refine more general EDI standards for specific domains or entities.

In some cases, entities use business-to-business (B2B) integration solutions to transform data between different formats. Configuring these solutions typically involves creating data transformation maps to map between data formats. One method of creating a data transformation map involves a user detailing an entity's data specification by entering the document components (e.g., records, fields, codes) specified by the data specification into a spreadsheet. The user further reads the logic specified in the entity's data specification to determine how it affects the mapping logic, reviews existing maps to determine if an existing map includes relevant rules and copies any relevant rules identified from the existing maps to the spreadsheet. A design time mapping tool is then used to create the map from the spreadsheet.

Decoding a trading partner's data specification, organizing its content, and deciphering its logic (e.g., business rules, processing logic and other logic), requires specialized training, experience, and substantial time and effort. The steps of creating the spreadsheet, reviewing the logic in a data specification, and selecting or creating appropriate rules are labor intensive, error prone, and can cause a bottleneck due to their reliance on the specialized knowledge of a small pool of users. The creation of a map from a spreadsheet using a design-time mapper tool can also be time consuming and error prone.

SUMMARY

One general aspect includes a computer-implemented method for artificial intelligence (AI)-assisted mapping of electronic data interchange (EDI) data to an alternative format. The computer-implemented method includes receiving a message implementation guideline (MIG) specifying a first data format for an electronic document for use within an EDI environment and automatically generating a data transformation map from the MIG. The data transformation map may include mapping rules for transforming messages formatted according to the MIG to a second data format. According to one embodiment, generating the data transformation map includes identifying, from the MIG, rules text of interest; generating a prompt to a large language model (LLM), the prompt including the rules text of interest and requesting that the LLM convert the rules text to data transformation mapping rules language, inputting the prompt to the LLM, receiving a response that includes an AI-generated mapping rule; and adding the AI-generated mapping rule to the map. According to one embodiment, the LLM is tuned with exemplar rules text and exemplar mapping rules according to a data transformation mapping rules language.

Generating the map further may also include accessing a rules base that includes predefined mapping rules and adding a predefined mapping rule that applies to an EDI segment or EDI element referenced in the MIG to the map.

According to one embodiment, normalization logic is executed to normalize the MIG and the map is generated from the normalized MIG.

Another embodiment includes an electronic document interchange (EDI) system that comprises a data transformation computer system coupled to the computer systems of a plurality of entities. The data transformation computer system comprises a data store storing a plurality of data transformation maps that were automatically generated from message implementation guidelines (MIGs) of the plurality of entities. The data transformation maps comprise data mapping rules for mapping from EDI data formats specified in the MIGs to a canonical data format.

The data transformation system further comprises a processor and a non-transitory, computer-readable medium storing computer code thereon. The computer code comprises instructions executable by the processor for receiving an EDI message from a first entity of the plurality of entities, the EDI message destined for a second entity of the plurality of entities, the EDI message including a document of a first document type; selecting a first data transformation map from the plurality of data transformation maps, the first data transformation map associated with the first entity and the first document type and including first data mapping rules, the first data mapping rules comprising a first artificial intelligence (AI)-generated data mapping rule; selecting a second data transformation map from the plurality of data transformation maps, the second data transformation map associated with the second entity and the first document type and including second data mapping rules, the second data mapping rules comprising a second AI-generated data mapping rule; executing the first data mapping rules to transform message data from the EDI message from a first EDI message format to the canonical data format; executing the second data mapping rules to transform the message data from the canonical data format to a second EDI message format; and forwarding the message data to the second entity using the second EDI message format.

The computer code may further comprise instructions executable by the processor for: accessing a MIG associated with an entity and automatically generating a new map for the associated entity from the new MIG. According to one embodiment, generating the new map comprises: identifying, from the new MIG, rules text of interest; generating a prompt to an LLM, the prompt including the rules text of interest and requesting that the LLM convert the rules text to a respective AI-generated mapping rule; inputting the prompt to the LLM; receiving the respective AI-generated mapping rule from the LLM; and adding the AI-generated mapping rule to the new map.

Embodiments also include corresponding computer systems, apparatus, and computer programs recorded on one or more computer storage devices, each configured to perform the actions of the methods.

Embodiments provide technical advantages by leveraging AI-assistance in map generation, thereby increasing the efficiency and accuracy of map creation.

Embodiments provide technical advantages by leveraging AI to accommodate a wide variety of MIG formats.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

WRITTEN DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure automate the creation of data transformation maps or portions thereof for the electronic exchange of documents. The maps (or portions thereof) are generated with reference to entity data specifications, such as message implementation guidelines (MIGs) provided by entities. Embodiments of the present disclosure leverage generative AI to generate mapping rules from logic contained in the entity data specifications.

Figure 1:
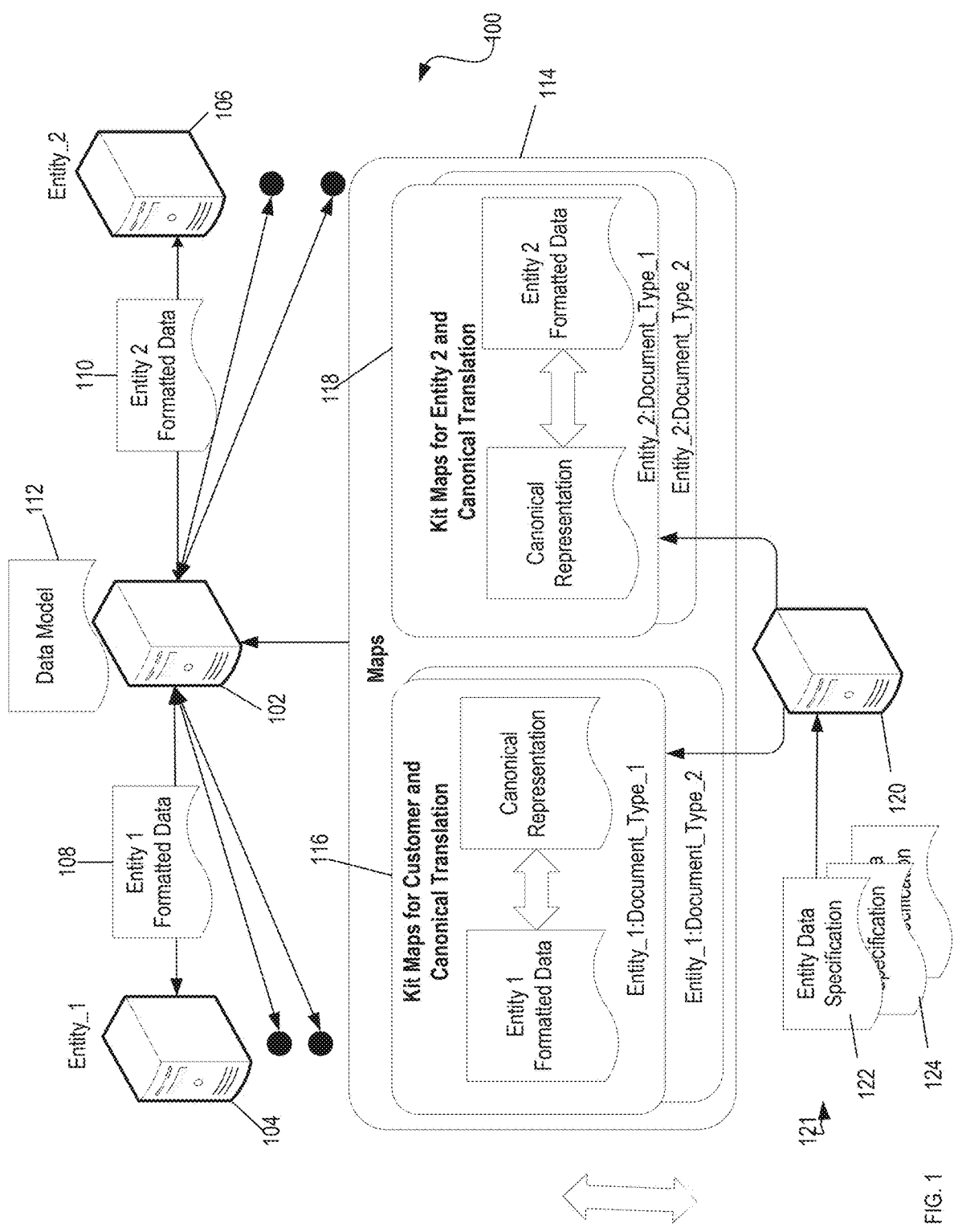
FIG. 1 is a diagrammatic representation of one embodiment of a data interchange environment that comprises a data transformation system coupled by a network to the computer systems of various entities.

FIG. 1 is a diagrammatic representation of one embodiment of a data interchange environment 100 that comprises a data transformation system 102 coupled by a network to the computer systems of various entities (e.g., computer system 106 of Entity_1 and computer system 108 of Entity_2 are indicated) that exchange information through data transformation system 102. Data interchange environment 100 also includes a map builder system 120 coupled to data transformation system 102 (e.g., by a network). While illustrated separately, data transformation system 102 and map builder system 120 may be implemented on the same computer system or may otherwise share hardware.

According to one embodiment, data transformation system 102 is a business-to-business (B2B) integration solution that supports the exchange of various types of documents used in B2B transactions, such as, but are not limited to, advanced ship notices (ASN), invoices, purchase orders, purchase order acknowledgements, payment remittance advices, payment orders, shipping notices, product activity data documents, inventory inquiries, functional acknowledgments, application advices, bills of lading, among others.

The entities that exchange data via data interchange environment 100 may use different data formats—for example, Entity_1 may use an invoice format that is different from the invoice format used by Entity_2. Data transformation system 102 is configured to transform data between the entity data formats, thereby allowing the exchange of information between connected entities that use different data formats. To this end, data transformation system 102 includes a map store 114 of maps for translating entity data to/from an intermediate data model 112. According to one embodiment, the maps are defined for various entity:document type tuples—for example, map store 114 may include a map for Entity_1:Invoice, Entity_1: Purchase_Order, Entity_2:Invoice, Entity_2:Purchase_Order and so on.

To facilitate the smooth exchange of information, entities may provide entity data specifications 121 for various document types. An entity data specification for a document type specifies a data format used by the entity for documents of that type. The data format defines the structure and content of documents of that type. An entity data specification may further include logic, such as business rules or other logic.

For an EDI environment, applicable EDI standards specify standardized data formats for documents of various types. For example, the ANSI ASC X12 standard for X12 EDI 850 purchase orders specifies a standardized data format for purchase orders, including the components of purchase orders and their logical arrangement (e.g., the hierarchical organization and sequence of segments, loops, and data elements). Some portions of an EDI standard may be optional according to the standard.

For EDI documents, an entity may provide a message implementation guide (MIG) as an entity data specification. A MIG refines a more generic EDI standard for a domain or entity. More particularly, the MIG specifies the EDI components from the more generic EDI standard that are applicable to the documents of that entity or domain and the logical arrangement of the components (e.g., the hierarchical organization and sequence of segments, loops, and data elements). For example, an entity's Purchase Order MIG may specify which components from a more generic ANSI ASC X12 standard for X12 EDI 850 purchase orders are used by the entity and the logical organization of the components in purchase orders. The MIG may also include logic, such as business rules and other logic, for engagement in an EDI environment. By way of example, but not limitation, a MIG may specify business logic for determining whether to include an optional segment or data element.

According to one embodiment, a MIG includes information for EDI components, such as segments and data elements, specified in a more generic EDI standard. Examples of segment information include, but are not limited to, a segment identifier (a code used to delineate the segment), segment position in the message structure, and data elements included in the segment. Other examples of segment information include, but are not limited to, loop information, segment name, segment description, segment usage (an indicator of whether that the segment is required, optional, or conditional), rules for the segment. For data elements, a MIG may specify data element information such as, but not limited to, a data element identifier (e.g., the reference code used to delineate the data element), data type, length, data format (syntax rules or encoding). Other examples of data element information include, but are not limited to, data element name, usage indicator (whether the data element is mandatory, optional, conditional, or not used), default value for the data element, a code list (e.g., country codes, currency codes), and logic, such as business rules, validation rules or other logic. The information included in a MIG for a segment, data element or other component of message will vary by MIG.

Map builder system 120 provides tools for automatically generating maps or portions thereof from entity data specifications, such as MIGs. Map builder system 120 leverages AI to translate logic, such as business rules or other logic, from the entity data specifications into/from a canonical data transformation mapping rules language. Map builder system 120 also provides tools for user creation, review, or editing of maps.

In operation, map builder system 120 receives entity data specifications 121 and processes them to generate maps. For example, map builder system 120 automatically generates map 116 from entity data specification 122 provided by Entity_1, map 118 from entity data specification 124 provided by Entity_2, and so on. Map builder system 120 stores the generated maps to map store 114.

Further, data transformation system 102 receives data from a source entity for forwarding to a target entity, accesses the appropriate map for the source entity:document type and destination entity:document type tuples, translates the data from the data format used by the source entity to an intermediate data model 112 according to the map for the source entity:document type tuple and translates data from intermediate data model 112 to the data format of the destination entity according to the map for the destination entity:document type tuple. For example, data transformation system 102 receives Entity_1 formatted data 108 that includes a document that is an instance of Document_Type_1, data transformation system 102 accesses map 116 for Entity_1:Document_Type_1 and map 118 for Entity_2:Document_Type_1 from map store 114, translates the document data from the format used by Entity 1 (that is, from the data format specified in entity data specification 122) to intermediate data model 112 according to map 116, translates the document data from intermediate data model 112 to the data format used by Entity_2 (that is, to the format specified by entity data specification 124) according to map 118, and forwards Entity_2 formatted data 110, which includes the transformed document, to computer system 106. Data transformation system 102 can similarly handle exchanges in the other direction.

Figure 2:
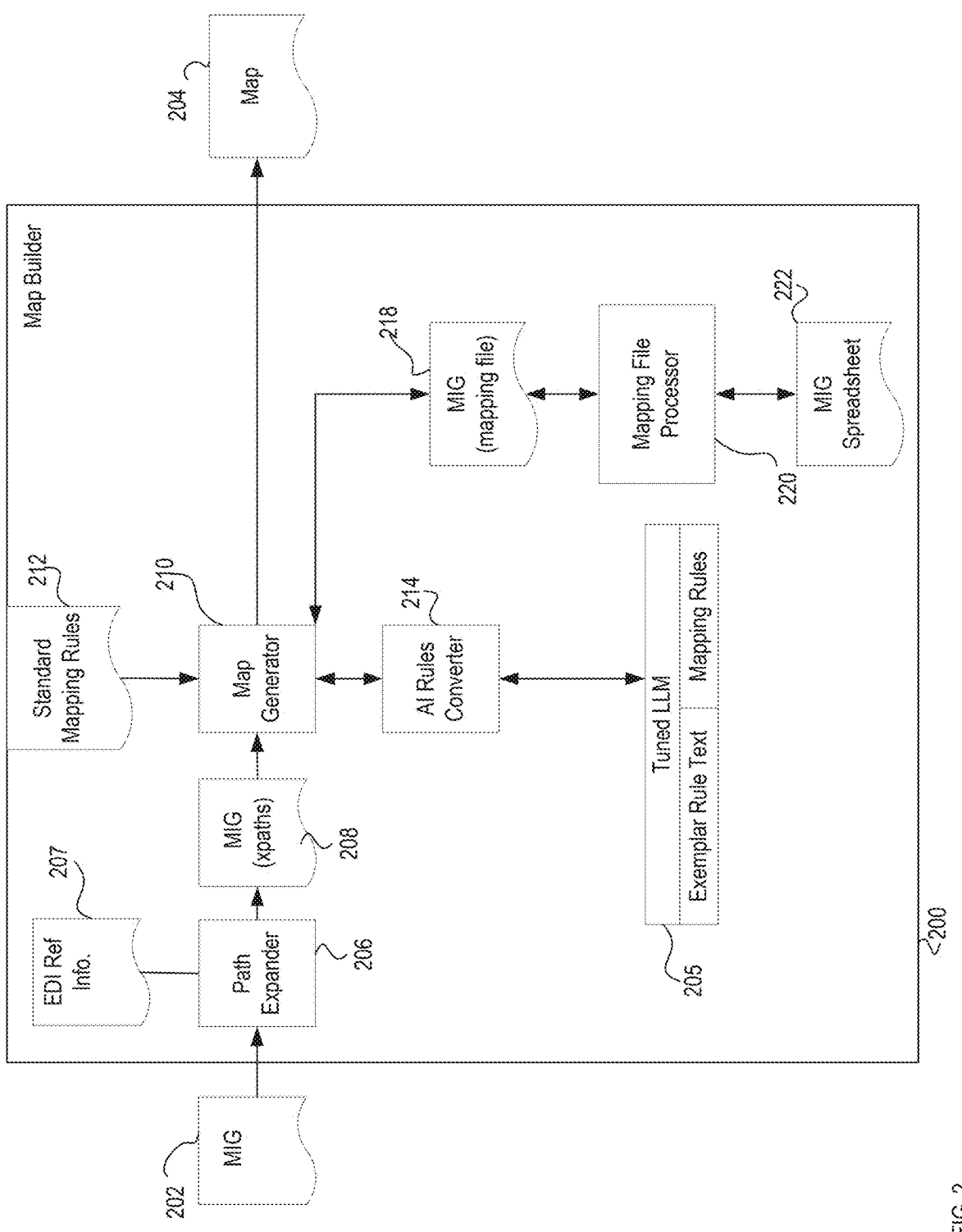
FIG. 2 is a diagrammatic representation of one embodiment of a map builder processing a MIG to generate a map.

FIG. 2 is a diagrammatic representation of one embodiment of a map builder 200 processing a MIG 202 for a document type provided by an entity to generate a map 204 for an entity:document type tuple. According to one embodiment, map builder 200 is implemented through the execution of software by a computer system, such as map builder system 120 or another computer system.

According to one embodiment, MIG 202 is an internal MIG representation that comprises text extracted from an entity provided MIG and stored according to a normalized, structured format, such as JSON, XML, or another structured format having, for example, normalized fields names. Extracted text that represents business logic is stored to known fields. For example, extracted text that represents business logic is stored to "notes" fields in one embodiment. MIG 202 may thus be provided in a structured format, such as a JSON, XML, or another structured format.

In practice, many MIGs do not provide complete paths to data elements but instead include graphics to visually indicate the hierarchical structure of the EDI data or simply rely on the reader's knowledge of EDI to understand the hierarchical message structure. Map builder 200 comprises a path expander 206 to expand data element paths in MIG 202 to full paths from a selected reference point.

The EDI standards specify the segments and data elements (including optional ones) applicable to various types of documents and the hierarchical organization of segments and data elements. The paths for the EDI data elements (including optional data elements) used in various types of EDI documents can thus be determined from the relevant EDI standards. For example, the ANSI ASC X12 EDI standards specify the EDI components and their organization for an X12 EDI 850 Purchase Order and, consequently, the paths for the data elements of an X12 EDI 850 Purchase Order can be determined. For example, according to the ANSI ASC X12 EDI 850 standard, the path from the ISA segment to a PO101 data element (line item identification element) for an ANSI ASC X12 EDI 850 purchase order is ISA>GS>ST->P01>PO101. As such, an EDI reference base 207 can be provided that specifies paths for data elements according to the relevant EDI standards. In one embodiment, EDI reference base 207 includes EDI reference files for various documents (document types) where the EDI reference file for a document type (e.g. the EDI reference file for ANSI ASC X12 EDI 850 purchase orders) specifies the full paths for the segments and data elements according to the relevant EDI standard.

Path expander 206 can thus parse MIG 202 to identify data elements based on data element identifiers and expand the data element paths to include an expanded path according to EDI reference base 207. For example, if MIG 202 is a MIG for an ANSI ASC X12 EDI 850 purchase order, path expander 206 may parse MIG 202 for references to the PO101 data element and insert the expanded path into the document (e.g., expand PO101 to ISA/GS/ST/P01/PO101) to generate MIG 208, which in this example, is MIG 202 augmented with the expanded paths.

Map generator 210 processes the MIG 208 to generate map 204 that includes mapping rules for mapping documents formatted according to MIG 202 to a canonical format used by an intermediate data model (e.g., intermediate data model 112). In one embodiment, map 204 is output as an OPEN TEXT CONTIVO mapping file.

Map builder 200 comprises a database of standard mapping rules 212 (SMRs 212) that specify the mapping links between known EDI components (e.g., segments, data elements) and the canonical fields of an intermediate data model (e.g., intermediate data model 112). For example, SMRs 212 may include a standard rule for mapping ISA/GS/ST/P01/PO101 to a canonical line item identification field in the canonical data model. According to one embodiment, map generator 210 selects the SMRs for inclusion in map 204 based on the EDI components (e.g., EDI segments and EDI data elements) being used according to the MIG.

Map generator 210 extracts the canonical related fields from the SMRs applicable to MIG 208 (e.g., the SMRs selected for inclusion in map 204). Map generator 210 passes the canonical related fields and MIG text (e.g., MIG 208 or chunks of MIG 208) to AI rules converter 214, which processes the rules text using LLM 205 to create AI-generated rules. AI-rules converter 214 returns valid AI-generated rules to map generator 210 for inclusion in map 204. One example embodiment of AI rules converter 214 is discussed in conjunction with FIG. 3.

According to one embodiment, LLM 205 is an LLM trained on large datasets and then tuned for a data transformation mapping rules language using examples of rules text (e.g., hypothetical rules text or rules text extracted from entity data specifications) and corresponding mapping rules according to a data transformation mapping rules language. In some embodiments, the data transformation mapping rules language is a programming language such as JAVA or other programming language. In other embodiments, the data transformation mapping rules language is a mapping rules language used by a data mapping tool such as OPEN TEXT CONTIVO or other data mapping tool. In some embodiments, LLM 205 is tuned for the canonical mapping rules language. In other embodiments, LLM 205 is tuned for an intermediate language, which AI rules converter 214 converts to the canonical data transformation mapping rules language. For example, LLM 205 may be tuned to output rules according to a coding language, which AI rules converter 214 converts to the canonical data transformation mapping rules language.

Map generator 210 thus generates map 204 using SMRs and, in some embodiments, AI-based mapping rules. AI-based mapping rules include, for example, AI-generated mapping rules or AI-generated mapping rules that have been modified. Map generator 210 can further output a mapping file 218 that includes all the information from the MIG (e.g., MIG 208) and the mapping rules. Mapping file processor 220 processes the mapping file 218 to generate a user editable file 222, which a user can review and edit. Mapping file processor 220 processes the edits to the user editable file 222 to update mapping file 218. Map generator 210 updates map 204 accordingly to incorporate the user's changes.

Figure 3:
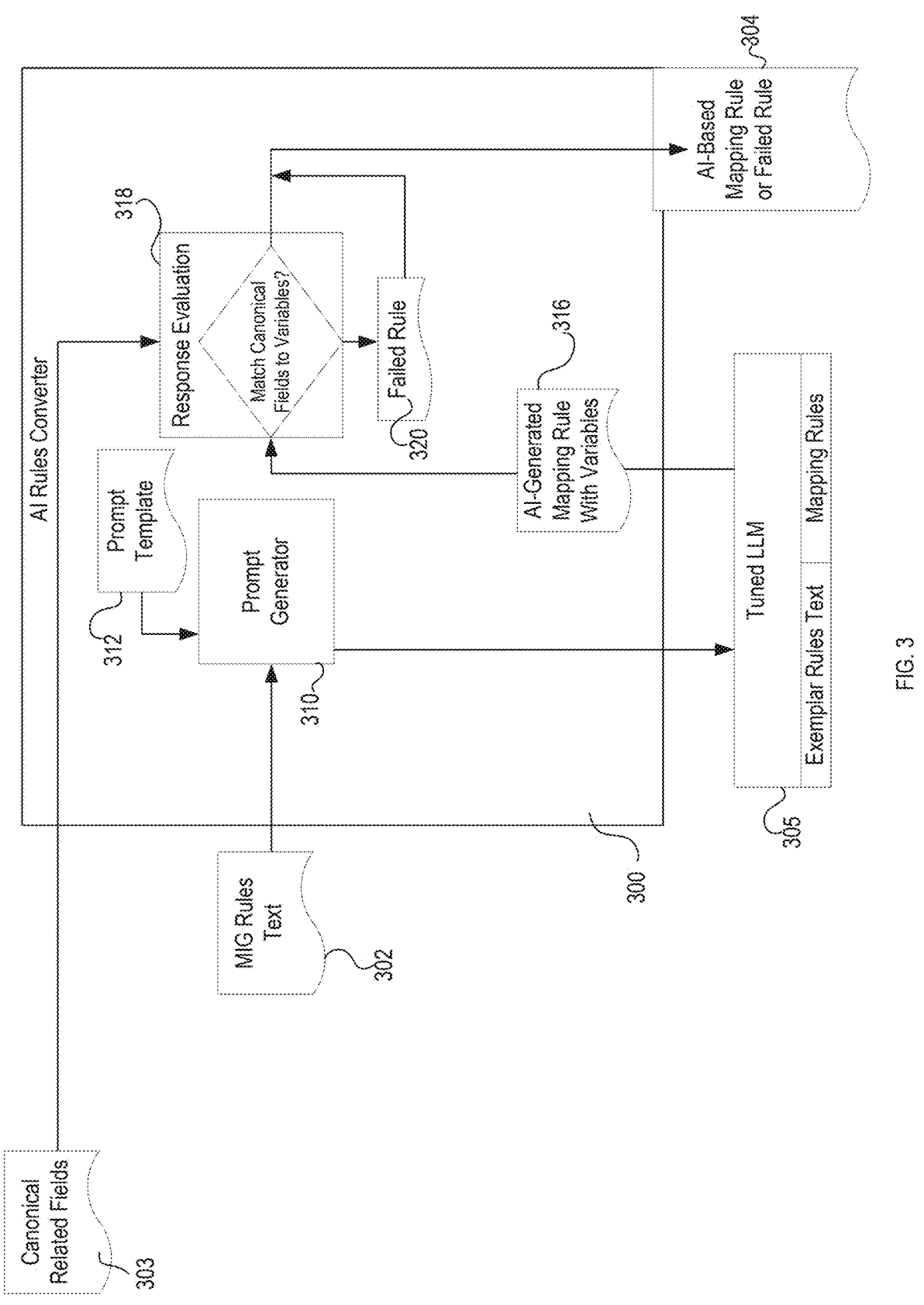
FIG. 3 is a diagrammatic representation of one embodiment of an AI rules converter.

FIG. 3 is a diagrammatic representation of one embodiment of an AI rules converter 300. According to one embodiment, AI rules converter 300 is implemented through the execution of software by a computer system, such as map builder system 120 or another computer system.

A mapping prompt generator 310, a response evaluator 318 and a prompt template 312. AI rules converter 300 includes or leverages LLM 305, which comprises an LLM tuned with mapping rules according to a data transformation mapping rules language (e.g., a canonical data transformation mapping rules language).

In operation, AI rules converter 300 receives rules text 302 of interest and canonical related fields 303 as input. Rules text 302 of interest comprises rules text extracted from a MIG. Using the example of MIG 202, text from one or more rules-text holding fields of MIG 202 may be provided as rules text 302 of interest. Canonical related fields 303 are extracted, in some embodiments, from the SMRs selected for inclusion in the map. AI rules converter 300 and processes MIG rules text 302 and canonical related fields 303 to generate AI rules converter output 304. According to one embodiment, AI rules converter output 304 comprises one or more of AI-based mapping rules or an indication one or more rules generated by LLM 305 failed.

Rules text 302 is passed to mapping prompt generator 310 to generate prompts to LLM 305. In one embodiment, mapping prompt generator 310 is configured with a prompt template 312 that includes prompt text, engineered for LLM 305, that can be combined with rules text 302 to generate a prompt to LLM 305.

As an example, template 312 may include prompt text such as:

Convert the text containing business logic and data processing logic to <mapping rules language>.
Input: <Target Field>/<Source Field>:<field>
<text> where the <mapping rules language> is a data transformation mapping rules language for which LLM 305 has been tuned, <Target Field>/<Source Field> implies the direction (e.g., "Target Field" (outbound) vs "Source Field" (inbound)) and <field> is the field value affected by the rule.

Using the example prompt template and Contivo mapping rules as the mapping rules language, if rules text 302 includes the following rules text, "The number of line items (ISA/GS/ST/CTT/CTT01) is the accumulation of the number of PO segments. If used, has total (ISA/GS/ST/CTT/CTT02) is the sum of the value of quantities ordered (ISA/GS/ST/BEG/P01/PO102) for each ISA/GS/ST/BEG/P01 segment" for an outbound translation, prompt generator 310 generates the prompt:

Convert the text containing business logic and data processing logic to Contivo mapping rules.
input: Target Field: ISA/GS/ST/CTT/CTT01
The number of line items (ISA/GS/ST/CTT/CTT01) is the accumulation of the number of PO segments. If used, has total (ISA/GS/ST/CTT/CTT02) is the sum of the value of quantities ordered (ISA/GS/ST/BEG/P01/PO102) for each ISA/GS/ST/BEG/P01 segment.

and inputs the prompt to LLM 305. LLM 305 generates a mapping rule according to the data transformation mapping rule language for which it has been tuned; in this example, a Contivo mapping rule. In some embodiments, LLM 305 outputs the rules according to an intermediate language, which the map builder converts to the canonical data transformation mapping rules language. In other embodiments, LLM 305 is tuned to output rules according to the canonical data transformation mapping rules language. In any case, LLM 305 returns an AI-generated mapping rule 316 based on the prompt from mapping prompt generator 310. AI-generated mapping rule 316 may contain variables.

Response evaluator 318 evaluates whether AI-generated mapping rule 316 is a valid rule. Determining whether AI-generated mapping rule 316 is a valid rule may comprise determining if the variables in AI-generated mapping rule 316 can be mapped to canonical fields from canonical related fields 303. If AI-generated mapping rule 316 includes a variable that cannot be matched to a canonical field, response evaluator 318 may return a rule output 320 indicating a failed rule. If the variables in AI-generated mapping rule 316 can be matched to canonical fields from canonical related fields 303, the variables are replaced with the names of the canonical fields in AI-generated mapping rule 316 and the AI-generated mapping rule, with the variables replace, is output as an AI-based mapping rule for inclusion in the map. In one embodiment, response evaluator 318 leverages AI, such as LLM 305, to match variables from the AI-generated mapping rule 316 to canonical fields from canonical related fields 303.

Figure 4:
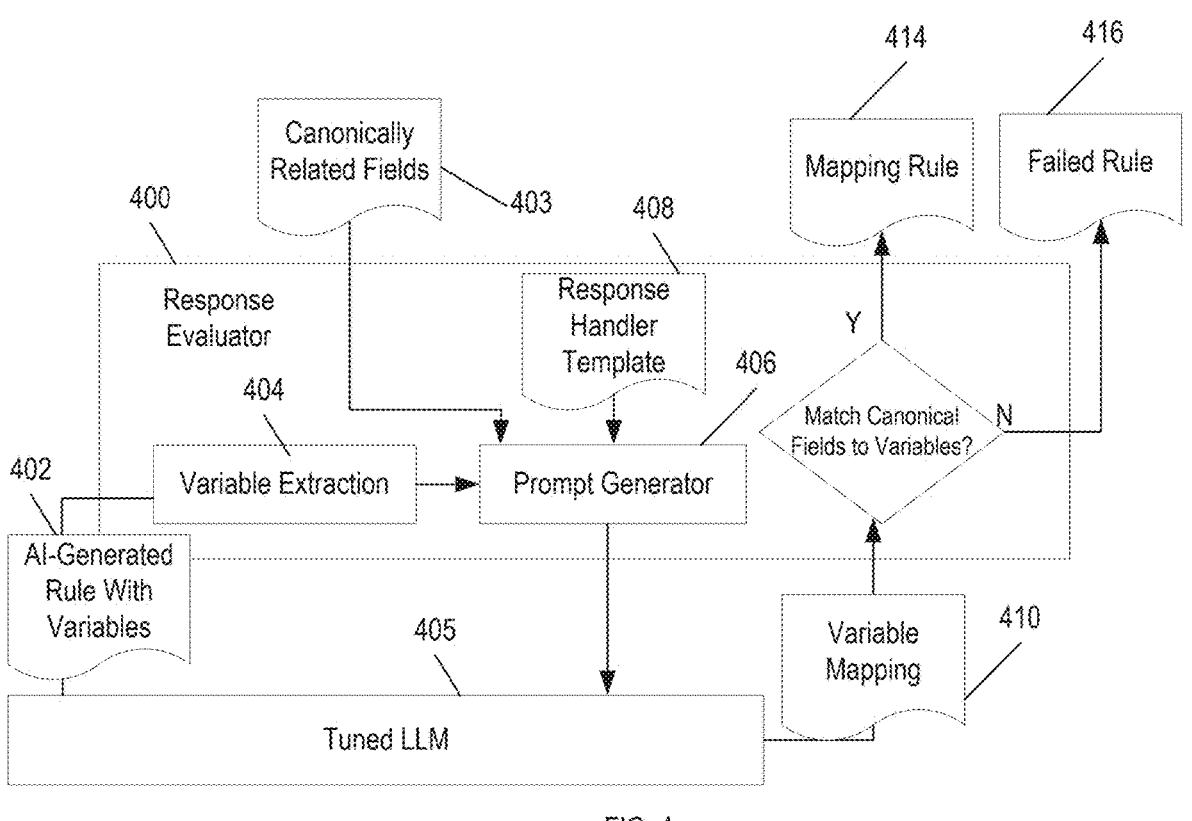
FIG. 4 is a diagrammatic representation of one embodiment of a response evaluator.

FIG. 4 is a diagrammatic representation of one embodiment of a response evaluator 400, which may be one embodiment of response evaluator 318. According to one embodiment, response evaluator 400 is implemented through the execution of software by a computer system, such as map builder system 120 or another computer system.

Response evaluator 400 receives a response 402 from LLM 405 that includes an AI-generated mapping rule generated from text extracted from a MIG. Response evaluator 400 also receives a list of canonical related fields 403 determined for the MIG (e.g., from the SMRs).

The AI-generated mapping rule may include variables. As will be appreciated, the variables may be easily identified from response 402 based on the syntax of the data transformation mapping rules language. Response evaluator 400 thus includes a parser 404 to extract the variables from in response 402.

Response evaluator 400 further includes a prompt generator 406 configured with a prompt template 408 that includes text for an engineered prompt. For example, prompt template 408 may include a prompt such as, "Given these two lists of words, output each word in the first list followed by a colon and then the word they are most related to in the second list." Prompt generator 406 generates a prompt using prompt template 408, a first list that includes the extracted variables and a second list that contains the canonical related fields. For example, prompt generator 406 may generate a prompt such as:

"Given these two lists of words, output each word in the first list followed by a colon and then the word they are most related to in the second list. List1: GoodAuthNum, test; List2: BCA01, test31, GoodAuthorizationNumber."

Prompt generator inputs the prompt to LLM 405 and receives a response 410 mapping the variables to matching canonical related fields (e.g., GoodAuthNum:GoodAuthorizationNumber, test31:test). If LLM 405 cannot match a variable from response 702 to a canonical related field, response evaluator 400 outputs rule output 416 indicating that the suggested rule of response 402 fails. If LLM matches each of the variables extracted from response 402 to a canonical related field, response evaluator 400 outputs the AI-generated mapping rule from response 402 as AI-based mapping rule 414. In some embodiments, AI-based mapping rule 414 is the AI-generated mapping rule 402 with the variables replaced with the matching canonical field names.

Figure 5:
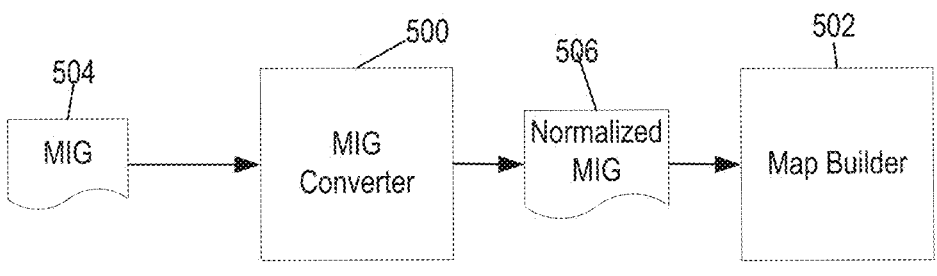
FIG. 5 illustrates one embodiment of a system that includes a MIG converter and map builder.

There are several MIG editing tools that are used to produce MIGs. In some embodiments, a user can map a MIG received from an entity to a normalized MIG format to generate a MIG for further processing. In some embodiments, a map builder system (e.g., map builder system 120) includes a MIG converter to automatically convert MIGs of different formats to a normalized MIG format. FIG. 5 illustrates one embodiment of a system that includes a MIG converter 500 and map builder 502, such as map builder 200. According to one embodiment, MIG converter 500 and map builder 502 are implemented through the execution of software by a computer system, such as map builder system 120 or another computer system. In operation, MIG converter receives MIG 504 having a known data format and converts MIG 504 to a normalized MIG 506 for input to map builder 502.

Figure 6:
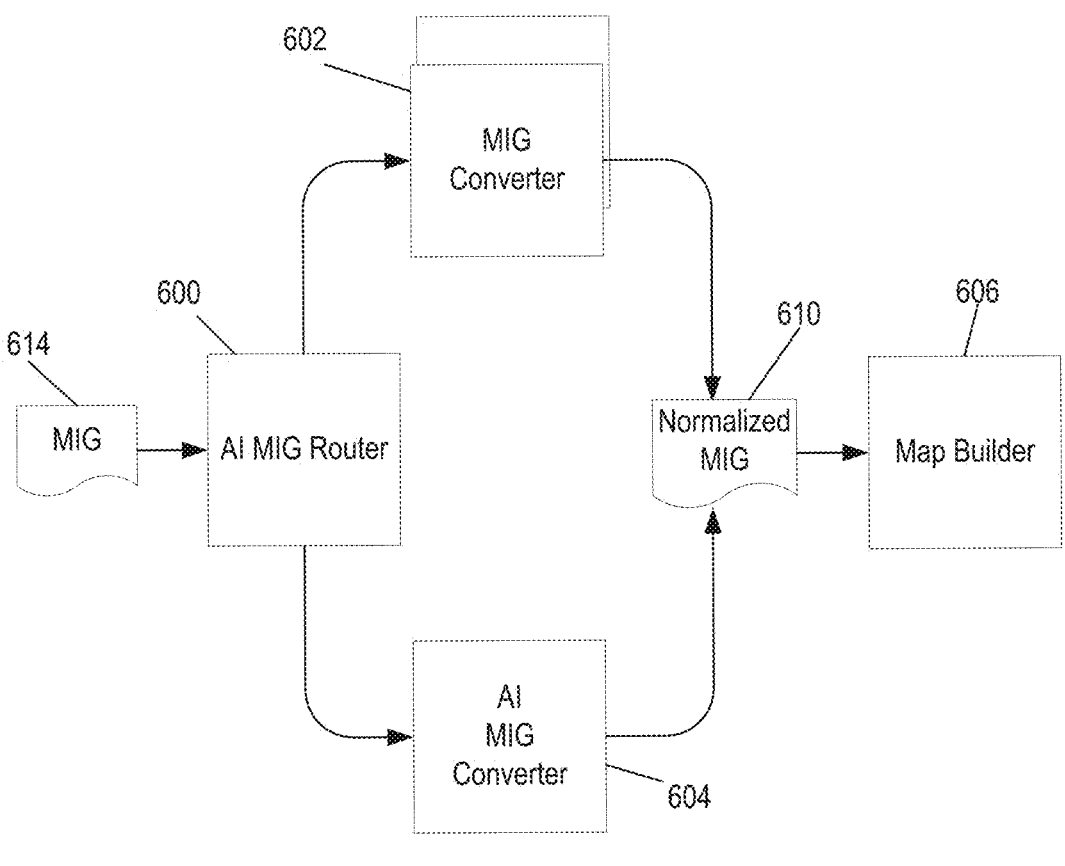
FIG. 6 illustrates another embodiment of a system for converting MIGs to a normalized MIG format.

FIG. 6 illustrates another embodiment of a system for converting MIGs to a normalized MIG format. In the embodiment illustrated, a system includes an AI MIG router 600, MIG converters 602, an AI MIG converter 604, and a map builder 606, such as map builder 600. According to one embodiment, AI MIG router 600, MIG converters 602, AI MIG converter 604, and map builder 606 are implemented through the execution of software by a computer system, such as map builder system 120 or another computer system.

MIG converters 602 comprise rules-based converters for converting MIGs produced by various MIG editing tools to a normalized MIG format. AI MIG converter 604 comprises an AI model trained to convert new MIG formats to the normalized MIG format. AI MIG router 600 comprises an AI model trained to classify MIGs based on the format of the MIG (e.g., the MIG editing tool used to create the MIG).

In operation, AI MIG router 600 receives MIG 614 and evaluates MIG 614 to classify MIG according to the format of the MIG. If the format identified for the MIG corresponds to one of the MIG converters 602, AI MIG router 600 routes MIG 614 to the appropriate converter for conversion to normalized MIG 610. If AI MIG router 600 classifies MIG 614 as having another format, AI MIG router 600 routes MIG 614 for conversion to normalized MIG 610 by AI MIG converter 604. Normalized MIG 610 is passed to map builder 906.

Figure 7:
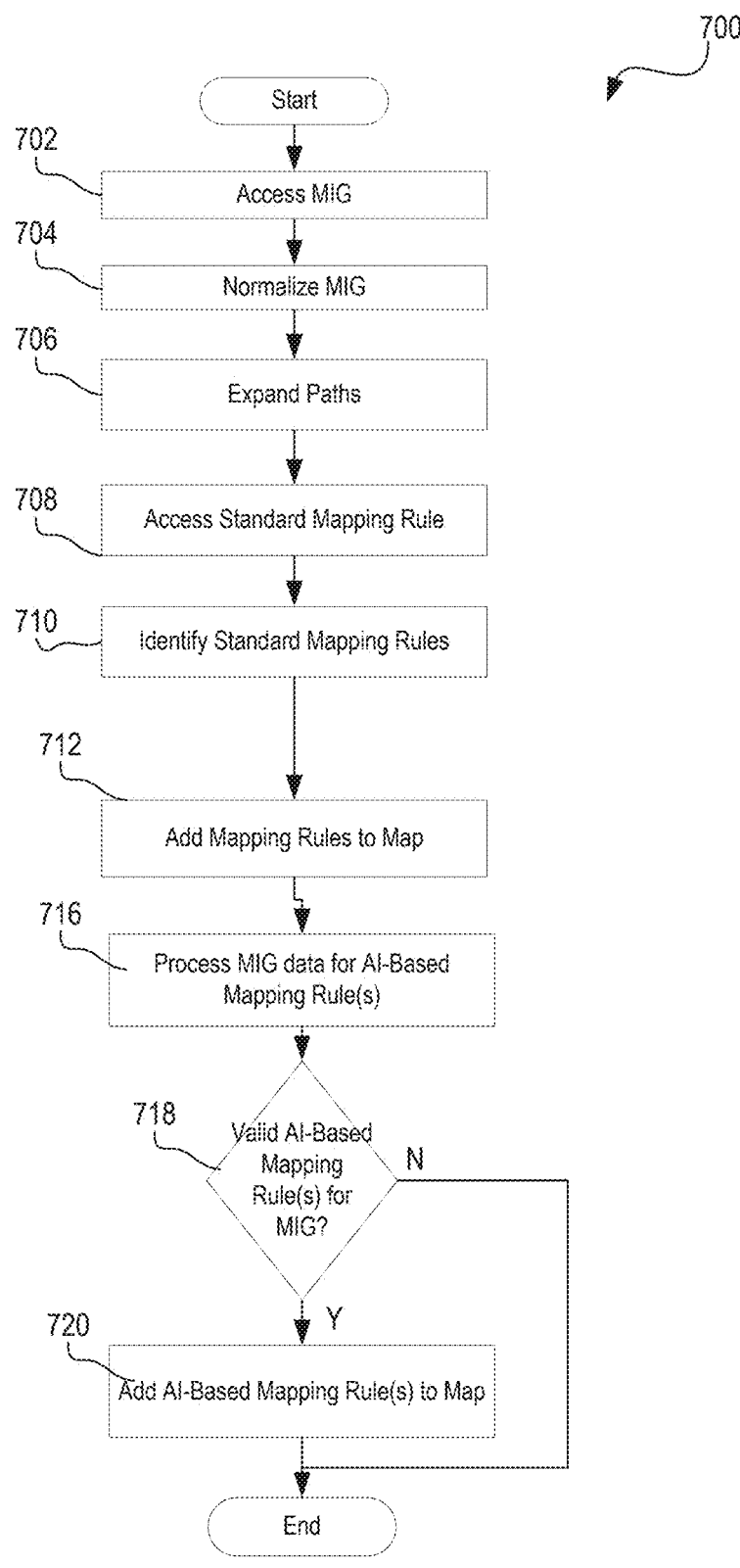
FIG. 7 is a flowchart illustrating one embodiment of a method for generating a map from a MIG.

FIG. 7 is a flowchart illustrating one embodiment of a method 700 for generating a map from a MIG. Method 700 may be executed by an exemplary system, such as map builder system 120 of FIG. 1. In some embodiments, method 700 is embodied as computer-translatable instructions stored on a non-transitory, computer-readable medium.

At step 702, a map builder system accesses a MIG. At step 704, the map builder system normalizes the MIG if the MIG is not in a normalized format. According to one embodiment, step 17004 is performed by a MIG converter such as MIG converter 500, a MIG converter selected from MIG converters 602, or an AI-based MIG converter 604.

At step 706, the map builder system expands paths in the MIG. An EDI reference base can be provided that specifies paths for data elements according to the relevant EDI standards. In one embodiment, the EDI reference base includes EDI reference files for various documents (document types) where the EDI reference file for a document type specifies the full paths for the segments and data elements according to the relevant EDI standard. A path expander (e.g., path expander 206) can thus parse the MIG to identify data elements based on data element identifiers and expand the data element paths to include an expanded path according to EDI reference base.

At step 708, the map builder system accesses a database of standard mapping rules. The standard mapping rules comprise predefined mapping rules for mapping EDI components such as segments and data elements to fields of an intermediate data model (e.g., data model 112). The map builder system identifies the SMRs that apply to the MIG (step 710) and adds the identified mapping rules to the map being generated (step 712). For example, the map builder system determines the SMRs that apply to the EDI components included in the MIG and adds the identified SMRs to the map. In some embodiments, the map builder system only includes the SMRs for EDI components that are specified as used (e.g., mandatory, conditional, or dependent) and not SMRs that apply to EDI components specified as "not used" in the MIG. According to one embodiment, steps 708-712 are performed by a map generator, such as map generator 210.

At step 716, the map builder system processes the MIG to generate AI-based mapping rules. According to one embodiment, the MIG rules text is passed to an AI rules converter (e.g., AI rules converter 214, AI rules converter 300) to generate mapping rules based on the extracted text.

If valid AI-based mapping rules are generated for the MIG, as determined at step 718, the map builder system adds them to the map (step 720). For example, the AI rules converter (e.g., AI rules converter 214, AI rules converter 300) returns valid mapping rules to a map generator (e.g., map generator 210), which adds the rules to the map being generated. In some embodiments, the AI-generated mapping rules are added to the map with the variables replaced by canonical field names.

FIG. 7 is merely an illustrative example, and the disclosed subject matter is not limited to the ordering or number of steps illustrated. Embodiments may implement additional steps or alternative steps, omit steps, or repeat steps.

Figure 8:
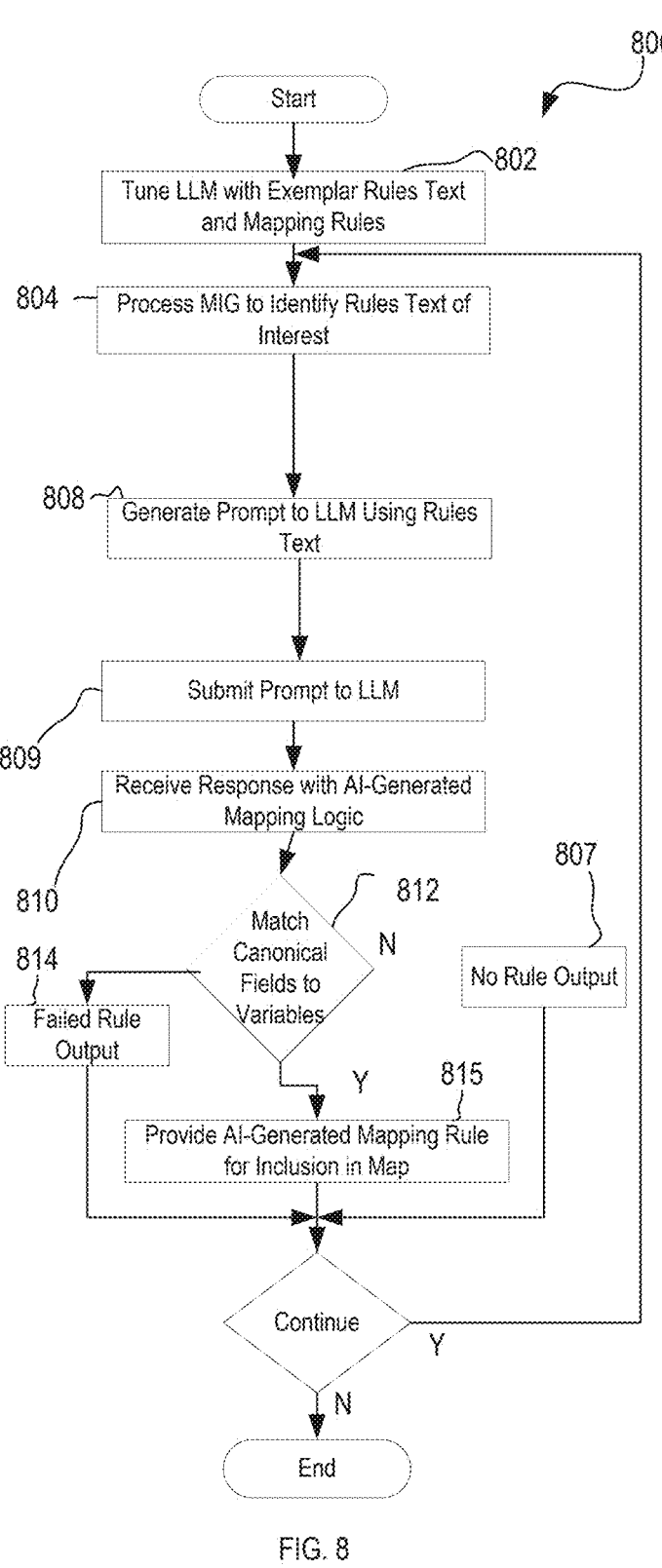
FIG. 8 is a flowchart illustrating one embodiment of a method for generating AI-based mapping rules for inclusion in a map.

FIG. 8 is a flowchart illustrating one embodiment of a method 800 for generating AI-based mapping rules for inclusion in a map. Method 800 may be executed by an exemplary system, such as map builder system 120 of FIG. 1. In some embodiments, method 800 is embodied as computer-translatable instructions stored on a non-transitory, computer-readable medium. Steps 804, 808, 809, 810 illustrate one embodiment of processing the MIG data to generate AI mapping rules (step 716) and step 812 illustrates one embodiment of step 618.

At step 702, an LLM is tuned for a data transformation mapping rules language using exemplar rules text from MIGs or hypothetical rules text and corresponding mapping rules according to a data transformation mapping rules language to generate a tuned LLM (e.g., LLM 205, LLM 305, LLM 405). In some embodiments, the data transformation mapping rules language is a programming language such as JAVA or other programming language. In other embodiments, the data transformation mapping rules language is a mapping rules language used by a data mapping tool such as OPEN TEXT CONTIVO or other data mapping tool. In some embodiments, the LLM is tuned for the canonical data transformation mapping rules language. In other embodiments, the LLM is tuned for an intermediate language, which is converted downstream to the canonical mapping rules language.

At step 804, the map builder system processes the MIG text to identify rules text of interest for use in generating AI-generated rules. According to one embodiment, for example the map builder system identifies text from defined fields used to hold business rules text or processing logic.

The map builder system generates a prompt to the tuned LLM to generate a mapping rule (step 808). For example, an AI rules converter (e.g., AI rules converter 214, AI rules converter 300) generates a prompt to the LLM (e.g., LLM 205, LLM 305, LLM 405). In one embodiment, the map builder system includes a prompt generator (e.g., prompt generator 310) that generates an engineered prompt using a prompt template (prompt template 312) and the rules text. At step 809, the map builder system submits the prompt to the tuned LLM. At step 810, the map builder system receives a response from the LLM that includes an AI-generated mapping rule with variables.

At step 812, the map builder system determines if variables included in the AI-generated mapping rule map to canonical related fields of the intermediate model. The canonical related fields may be extracted from the SMRs that were selected for inclusion in the map (e.g., the standard mapping rules identified at step 810).

In one embodiment, a response evaluator (e.g., response evaluator 318, response evaluator 400) leverages AI to match variables included in an AI-generated mapping rule to canonical fields included in the SMRs. If the mapping rule includes a variable that cannot be matched to a canonical related field, the response evaluator may return a rule output indicating a failed rule (step 814). If the variables in the mapping are matched to canonical related fields, the variables are replaced with the names of the canonical related fields in mapping rule and the AI-generated mapping rule output as a suggested rule for inclusion in the map (step 815). The map builder system can continue to process the MIG until all the rules text of interest has been processed or another ending condition is met.

FIG. 8 is merely an illustrative example, and the disclosed subject matter is not limited to the ordering or number of steps illustrated. Embodiments may implement additional steps or alternative steps, omit steps, or repeat steps.

Figure 9:
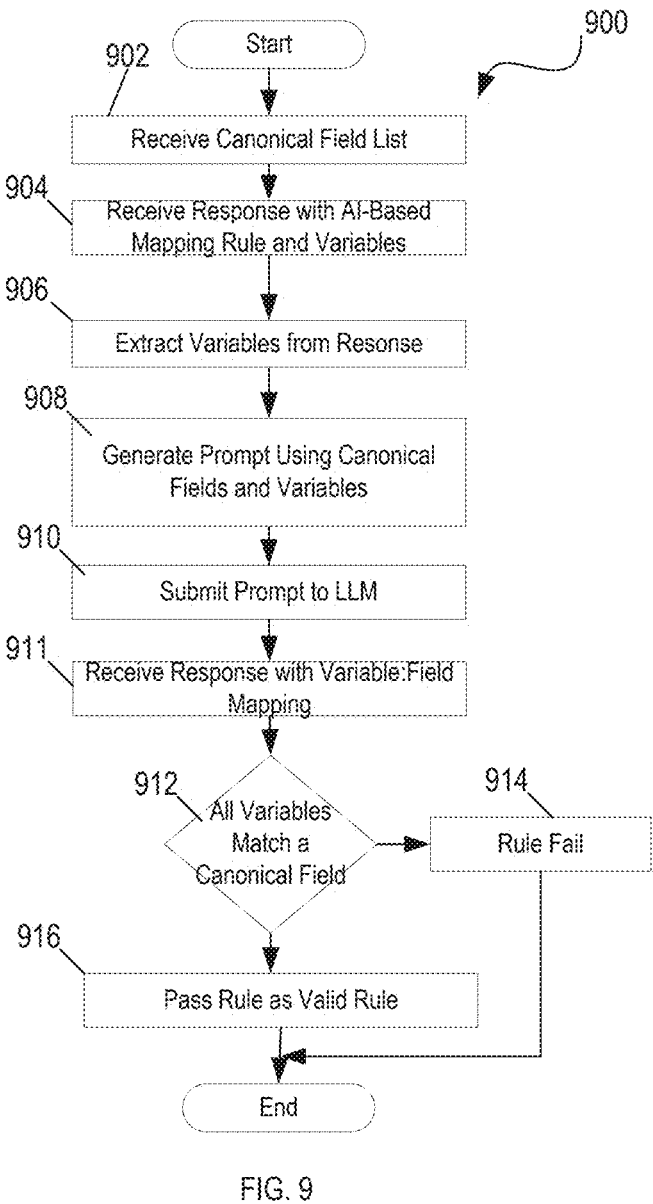
FIG. 9 is a flowchart illustrating one embodiment of a method for evaluating a response from an AI model to determine if an AI-based mapping rule is a valid rule.

FIG. 9 is a flowchart illustrating one embodiment of a method 900 for evaluating a response from an AI model to determine if an AI-based mapping rule is a valid rule. Method 900 may be executed by an exemplary system such as map builder system 120 of FIG. 1. In some embodiments, method 900 is embodied as computer-translatable instructions stored on a non-transitory, computer-readable medium. According to one embodiment, method 900 is implemented by a response evaluator, such as response evaluator 918 or response evaluator 900.

At step 902, a canonical field list is received. For example, response evaluator 918 receives canonical related fields 303 or response evaluator receives canonical related fields 403. The canonical related fields are determined, in one embodiment, from the SMRs selected for inclusion in the map (e.g., at step 710).

A response from an LLM is received that includes an AI-based mapping rule with variables (step 904). At step 906, variables are extracted from the response. As will be appreciated, the variables may be easily identified from the response based on the syntax of the data transformation mapping rules language. Thus, for example, a parser (e.g., parser 404) can be configured to parse responses to extract variables.

At step 908, a prompt is generated using the canonical fields and variables. The prompt requests that an LLM match the variables to the closest related canonical fields. According to one embodiment, the list of variables and the list of canonical related fields are combined with engineered prompt language from a prompt template to generate the prompt to the LLM. At step 910, the prompt is submitted to the LLM.

At step 911, a response is received from the LLM including a listing of variables mapped to the closest related canonical related fields. At step 912, the response is analyzed to determine if all the variables from the AI-generated rule could be matched to a canonical related field. If a variable could not be mapped to a canonical related field by the LLM, the AI-generated rule fails and a rule output indicating that the rule failed is generated (step 914). If all the variables from the AI-based mapping rule are mapped to canonical related fields in the response received from the LLM at step 912, the AI-mapping rule may be considered valid and is passed as a suggested rule for inclusion in the map (step 916). As discussed, the variable names may be replaced with the canonical field names in some embodiments.

FIG. 9 is merely an illustrative example, and the disclosed subject matter is not limited to the ordering or number of steps illustrated. Embodiments may implement additional steps or alternative steps, omit steps, or repeat steps.

Figures 10, 11:
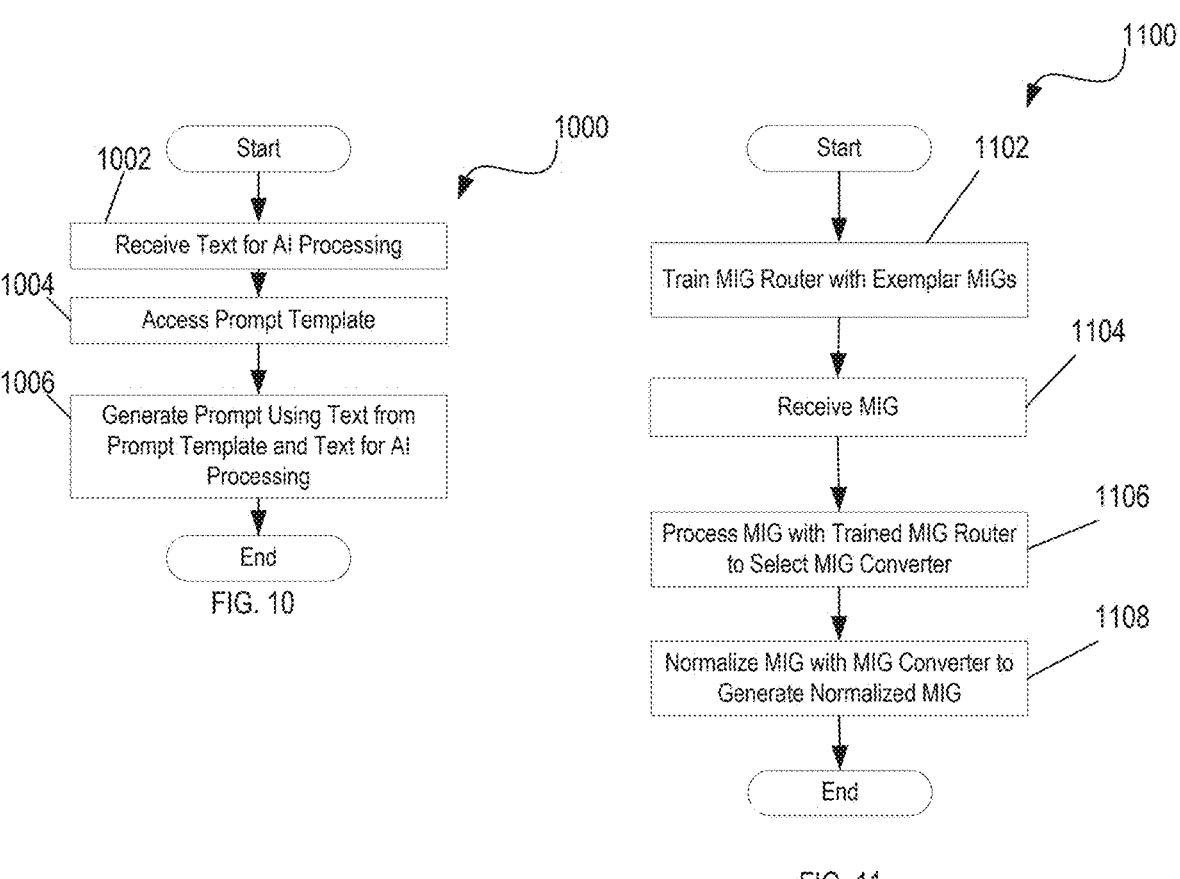
FIG. 10 is a flowchart illustrating one embodiment of a method for prompt generation.
FIG. 11 is a flowchart illustrating one embodiment of a method for normalizing a MIG.

Various embodiments may include generating prompts to an LLM. FIG. 10 is a flowchart illustrating one embodiment of a method 1000 for prompt generation. Method 1000 may be executed by an exemplary system such as map builder system 120 of FIG. 1. In some embodiments, method 1000 is embodied as computer-translatable instructions stored on a non-transitory, computer-readable medium. According to one embodiment, method 1000 is implemented by a prompt generator, such as prompt generator 310 or prompt generator 406.

At step 1002, text for AI-processing is received. For example, prompt generator 310 receives extracted rules text 302 or prompt generator 406 receives variables extracted from an AI-generated rule and canonical related fields 403.

At step 1004, a prompt template is accessed. For example, prompt generator 310 accesses prompt template 312, or prompt generator accesses prompt template 708. The prompt template includes prompt language engineered for an LLM to prompt the LLM to perform a task with respect to submitted text.

At step 1006, a prompt is generated by combining the text for AI-processing with the prompt language from the prompt template.

FIG. 10 is merely an illustrative example, and the disclosed subject matter is not limited to the ordering or number of steps illustrated. Embodiments may implement additional steps or alternative steps, omit steps, or repeat steps.

FIG. 11 is a flowchart illustrating one embodiment of a method 1100 for normalizing a MIG. Method 1100 may be executed by an exemplary system such as map builder system 120 of FIG. 1. In some embodiments, method 1100 is embodied as computer-translatable instructions stored on a non-transitory, computer-readable medium.

At step 1102, an AI MIG router is trained to classify MIGs. According to one embodiment, the AI MIG router trained on a corpus of training data that includes examples of a plurality MIG classes, where the classes correspond to MIG converters. Each of the MIG converters is executable to convert MIGs from the format in which MIG was received to a normalized format. For example, an AI model can be trained to recognize MIGs produced by different MIG editing tools. In some embodiments, one or more of the classes correspond to a hard-coded MIG converter and one or more of the classes correspond to an AI-based MIG converter.

At step 1104, a MIG is received. At step 1106, the MIG is processed with the trained AI MIG router. Based on the class determined for the MIG by the AI MIG, normalization logic is selected for normalizing the MIG. For example, a MIG converter is selected based on the class predicted for the MIG by the AI MIG router. At step 1108, the normalization logic (e.g., the MIG converter) is executed to normalize the MIG.

FIG. 11 is merely an illustrative example, and the disclosed subject matter is not limited to the ordering or number of steps illustrated. Embodiments may implement additional steps or alternative steps, omit steps, or repeat steps.

Figure 12:
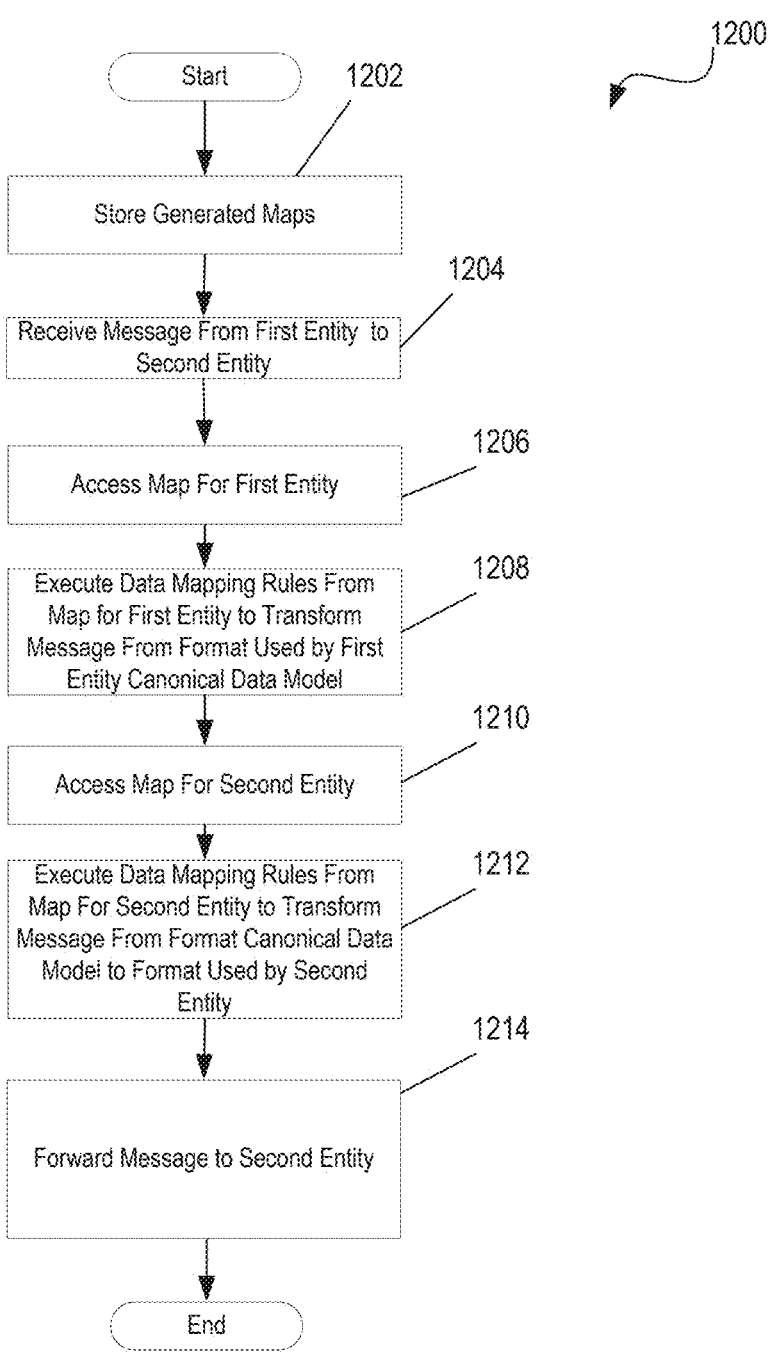
FIG. 12 is a flowchart illustrating one embodiment of a method for transforming data.

FIG. 12 is a flowchart illustrating one embodiment of a method 1200 for transforming data. Method 1200 may be executed by an exemplary system such as map builder system 120 and data transformation system 102 of FIG. 1. In some embodiments, method 1200 is embodied as computer-translatable instructions stored on a non-transitory, computer-readable medium.

At step 1202, transformation maps are stored, including transformation maps that contain AI-based mapping rules. For example, map builder system 120 stores maps to map store 114. In some embodiments, the maps were automatically generated.

At step 1204, a message directed to a second entity is received from a first entity. For example, data transformation system 102 receives Entity_1 formatted data 108 from computer system 104.

A map for the first entity is accessed (step 1206). For example, data transformation system 102 accesses map 116 based on a source entity:document_type tuple associated with the message.

At step 1208, mapping rules from the map for the first entity are executed to map the message from a data format used by the first entity for the document type to a canonical model. For example, data transformation system 102 executes mapping rules from map 116 to map Entity_1 formatted data 108 to intermediate data model 112.

At step 1210, a map for the second entity is accessed. For example, data transformation system 102 accesses map 118 based on a destination entity:document_type tuple associated with the message.

At step 1212, mapping rules from the map for the second entity are executed to map the message from the canonical model to the data format used by the second entity. For example, data transformation system 102 executes mapping rules from map 118 to map the message from data model 112 to Entity_2 formatted data 110.

At step 1214, the message is forwarded to the second entity. For example, data transformation system 102 forwards Entity_2 formatted data 110 to computer system 106 of Entity_2.

FIG. 12 is merely an illustrative example, and the disclosed subject matter is not limited to the ordering or number of steps illustrated. Embodiments may implement additional steps or alternative steps, omit steps, or repeat steps.

Figure 13:
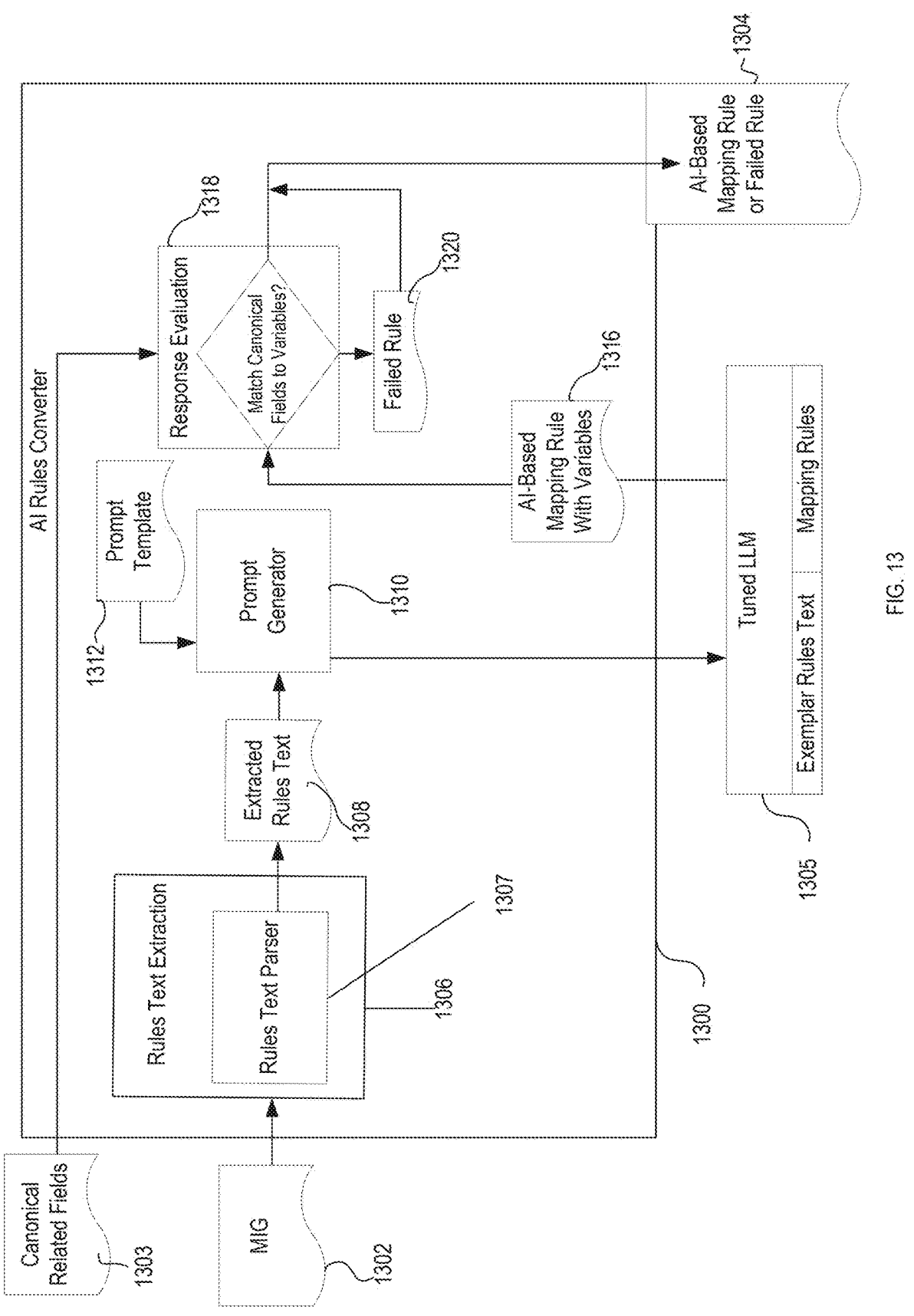
FIG. 13 is a diagrammatic representation of another embodiment of an AI rules converter.

FIG. 13 is a diagrammatic representation of another embodiment of an AI rules converter 1300. According to one embodiment, AI rules converter 1300 is implemented through the execution of software by a computer system, such as map builder system 120 or another computer system.

AI rules converter 1300 is similar to AI rules converter 300 but includes text extractor 1306. AI rules converter 1300 includes or leverages LLM 1305, which comprises an LLM tuned with mapping rules according to a data transformation mapping rules language (e.g., a canonical data transformation mapping rules language).

In the example of FIG. 13, the AI rules converter extracts the rules text from a MIG. In operation, AI rules converter 1300 receives MIG text 1302 and canonical related fields 1303 as input. MIG text 1302 may comprise the entire text from a MIG or a portion of a MIG. Canonical related fields 1303 are extracted, in some embodiments, from the SMRs selected for inclusion in the map. AI rules converter 1300 processes MIG text 1302 and canonical related fields 1303 to generate AI rules converter output 1304. According to one embodiment, AI rules converter output 1304 comprises one or more of AI-based or an indication that one or more rules generated by LLM 1305 failed.

As will be appreciated, MIGs often contain business rules and other logic in known fields of the MIG. Rules text extractor 1306 includes a rules parser 1307 comprising rules executable to parse MIG text 1302 for fields known to contain rules text and extract the text from the fields. In addition, or in the alternative, rules text extractor 1306 uses a machine learning model to analyze MIG text 1302 to determine if MIG text 1302 includes rules text. If rules text extractor 1306 does not identify rules text from MIG text 1302, rules text extractor 1306 may return an output indicating that no rules text was identified. If rules text extractor 1306 does identify rules text from MIG text 1302, rules text extractor 1306 extracts rules text 1308 from MIG text 1302. The extracted rules text 1308 comprises business rules or other logic for conversion to mapping rules.

Rules text 1308 is passed to mapping prompt generator 1310 to generate prompts to LLM 1305. In one embodiment, mapping prompt generator 1310 is configured with a prompt template 1312 that includes prompt text, engineered for LLM 1305, that can be combined with rules text 1308 to generate a prompt to LLM 1305.

LLM 1305 generates a mapping rule according to the data transformation mapping rule language for which it has been tuned (e.g., a coding language, a mapping rules language of a mapping tool). In some embodiments, LLM 1305 outputs the rules according to an intermediate language, which the map builder converts to the canonical data transformation mapping rules language. In other embodiments, LLM 1305 is tuned to output rules according to the canonical data transformation mapping rules language. In any case, LLM 1305 returns an AI-generated mapping rule 1316 based on the prompt from mapping prompt generator 1310. AI-generated mapping rule 1316 may contain variables.

Response evaluator 1318 evaluates whether AI-generated mapping rule 1316 is a valid rule. Determining whether AI-generated mapping rule 1316 is a valid rule may comprise determining if the variables in AI-generated mapping rule 1316 can be mapped to canonical fields from canonical related fields 1303. If AI-generated mapping rule 1316 includes a variable that cannot be matched to a canonical field, response evaluator 1318 may return a rule output 1320 indicating a failed rule. If the variables in AI-generated mapping rule 1316 can be matched to canonical fields from canonical related fields 303, the variables are replaced with the names of the canonical fields in AI-generated mapping rule 1316 and the AI-generated mapping rule, with the variables replace, is output as a suggested mapping rule for inclusion in the map. In one embodiment, response evaluator 1318 leverages AI, such as LLM 1305, to match variables from the AI-generated mapping rule 1316 to canonical fields from canonical related fields 1303.

Figures 14, 15:
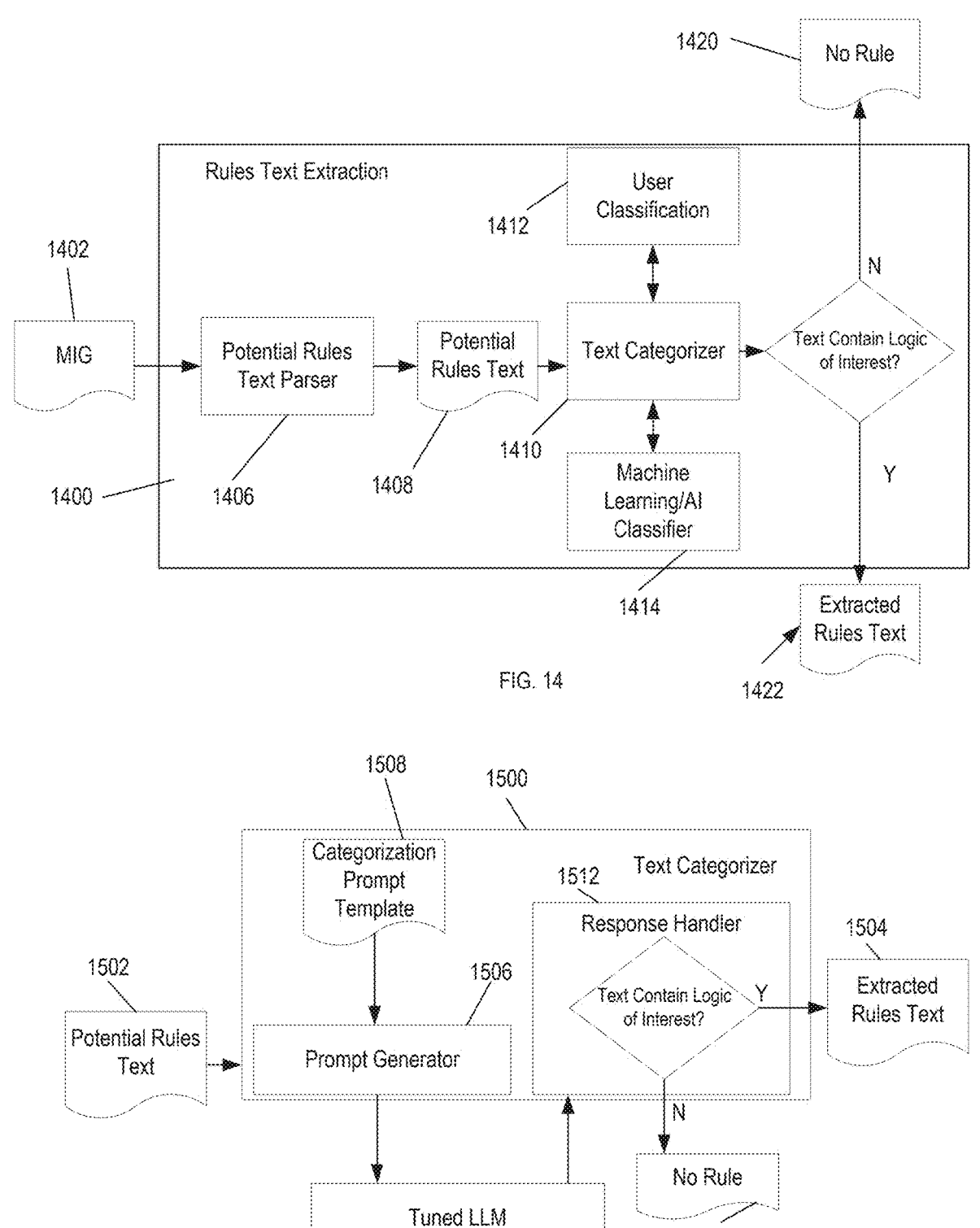
FIG. 14 is a diagrammatic representation of another embodiment of a rules text extractor.
FIG. 15 is a diagrammatic representation of one embodiment of a text categorizer processing potential rules text to output extracted rules text.

FIG. 14 illustrates another example embodiment of a rules-text extractor 1400. According to one embodiment, rules text extractor 1400 is implemented through the execution of software by a computer system, such as map builder system 120 or another computer system.

Rules text extractor 1400 includes rules text parser 1406 that implements parsing rules to parse MIG text 1402 for fields known to contain rules text. If MIG text 1402 contains text that meets the parsing rules of rules text parser 1406, potential rules text parser 1406 extracts the text as potential rules text 1408, which is passed to text categorizer 1410.

Text categorizer 1410, according to one embodiment, includes a user interface 1412 to allow a user to classify the potential rules text 1408 as rules text or not rules text. In addition, or in the alternative, text categorizer 1410 uses an automated classifier 1414, such as a machine learning (ML) or AI classifier to classify the text. In one embodiment, text categorizer 1410 leverages the LLM used to generate mapping rules (e.g., LLM 1305) as an automated classifier 1414. One embodiment of text categorizer 1410 is discussed in conjunction with FIG. 15.

If the potential rules text 1408 contains rules text according to the classification assigned by a user using user interface 1412 or automated classifier 1414, rules text extractor 1400 outputs the potential rules text as extracted rules text 1422—for example, extracted rules text 1308 of FIG. 3. If the potential rules text 1408 does not contain rules text according to the classification assigned by a user using user interface 1412 or automated classifier 1414, rules text extractor 1400 outputs rule output 1420 indicating that MIG text 1402 does not contain rules text.

FIG. 15 is a diagrammatic representation of one embodiment of a text categorizer 1500 processing potential rules text 1502 to output extracted rules text 1504. According to one embodiment, text categorizer 1500 is implemented through the execution of software by a computer system, such as map builder system 120 or another computer system.

Text categorizer 1500 comprises a prompt generator 1506 and a response handler 1512. Prompt generator 15606 is configured with a categorization prompt template 1508 for generating an engineered prompt to an LLM 1510. In one embodiment, prompt template 1508 includes a prompt, engineered for LLM 1510, into which potential rules text 1502 can be inserted. In some embodiments, LLM 1510 is the same LLM used to generate mapping rules (e.g., LLM 1305).

In operation, text categorizer 1500 receives potential rules text 1502. Potential rules text 1502 comprises a MIG or portion thereof. In one embodiment, potential rules text 1502 comprises text extracted by a potential rules text parser (e.g., potential rules text parser 1406).

Prompt generator 1506 generates a prompt to LLM 1510 using categorization prompt template 1508. For example, if categorization prompt template 1508 includes the prompt text "You are a business analyst and can recognize if text contains business logic. You are also an expert in data processing and recognize if text contains data processing logic. If the following text contains data processing logic or business rules, then respond with a 'yes' otherwise respond with 'no':<potential rules text>" where <potential rules text> is potential rules text 1502. Prompt generator 1506 inputs the prompt to LLM 1510.

In this example, LLM 1510 responds with an answer of "yes" or "no" for potential rules text 1502. If LLM 1510 classifies potential rules text 1502 as not containing logic of interest (e.g., responds with "no"), response handler 1512 outputs rule output 1514 indicating that potential rules text 1502 (or MIG text from which potential rules text 1502 was extracted) does not contain rules text of interest. If LLM 1510 classifies potential rules text 1502 as containing logic of interest (e.g., responds with "yes"), response handler 1512 outputs potential rules text 1502 as extracted rules text 1504. Extracted rules text 1502, according to one embodiment, is passed to a mapping prompt generator (e.g., mapping prompt generator 1310) to prompt an LLM to generate mapping rules from extracted rules text 1504.

Figure 16:
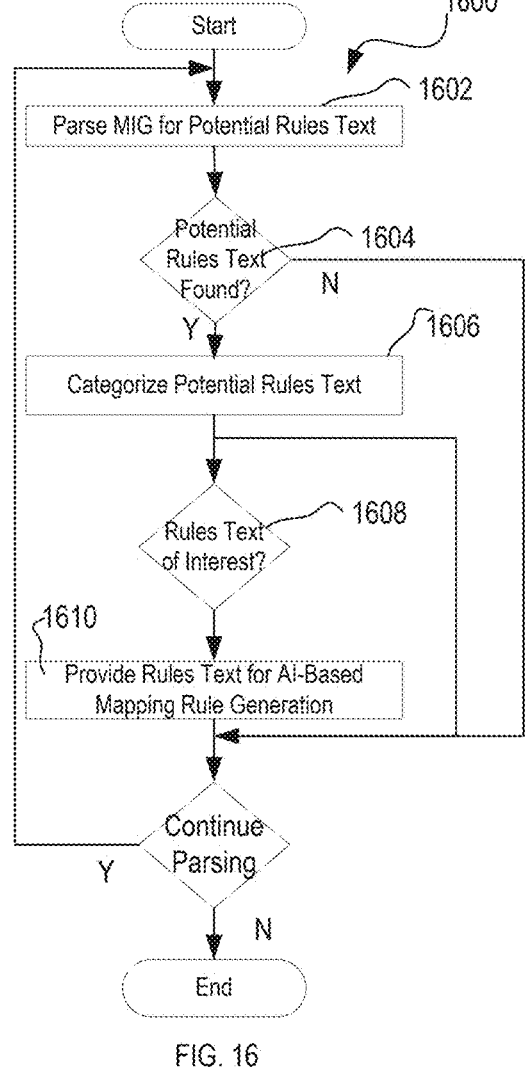
FIG. 16 is a flowchart illustrating one embodiment of a method for processing a MIG to generate rules text of interest.

FIG. 16 is a flowchart illustrating one embodiment of a method 1600 for processing a MIG to generate rules text. Method 1600 may be executed by an exemplary system, such as map builder system 120 of FIG. 1. In some embodiments, method 1600 is embodied as computer-translatable instructions stored on a non-transitory, computer-readable medium. Method 1600, according to one embodiment, is implemented by a rules text extractor, such as rules text extractor 1306.

At step 1602, the map builder system parses the MIG for potential rules text. The map builder system may include, for example, a parser that implements parsing rules to parse the MIG text for potential rules text.

If the MIG contains text that meets the parsing rules of the potential rules text parser, the potential rules text parser extracts the text as potential rules text. If potential rules text is extracted from the MIG (step 1604), the map builder system categorizes the rules text as being rules text of interest or according to another category (e.g., not rules text of interest) (step 1606).

According to one embodiment, the map builder system includes a user interface (e.g., user interface 1412) to allow a user to classify the potential rules text as rules text of interest or not rules text of interest. In addition, or in the alternative, the map builder system uses an automated classifier (e.g., automated classifier 1414), such as a machine learning classifier (ML) or AI classifier to classify the text. In one embodiment, the map builder system uses an LLM as an automated classifier.

If the potential rules text is categorized as rules text of interest (e.g., as determined at step 1608), the map builder system provides the rules text of interest for AI-based mapping rule generation (step 1610). For example, a rules text extractor (e.g., rules text extractor 1306) outputs the rules text of interest to a map generator for use in AI-based generation of mapping rules.

The map builder system can continue parsing the text of the MIG to extract and process text to identify rules text of interest until a stopping condition is met.

FIG. 16 is merely an illustrative example, and the disclosed subject matter is not limited to the ordering or number of steps illustrated. Embodiments may implement additional steps or alternative steps, omit steps, or repeat steps.

Figure 17:
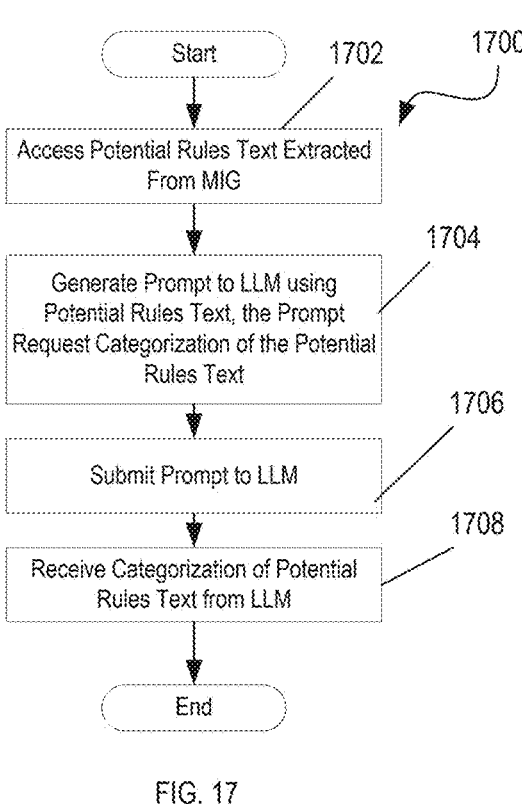
FIG. 17 is a flowchart illustrating one embodiment of a method for categorizing whether potential rules text is of interest for AI-based mapping rule generation.

FIG. 17 is a flowchart illustrating one embodiment of a method 1700 for categorizing whether potential rules text is rules text of interest for AI-based mapping rule generation. Method 1700 may be executed by an exemplary system, such as map builder system 120 of FIG. 1. In some embodiments, method 1700 is embodied as computer-translatable instructions stored on a non-transitory, computer-readable medium. According to one embodiment, method 1700 is implemented by a rules text extractor, such as rules text extractor 1400. In an even more particular embodiment, method 1700 is implemented by a text categorizer, such as text categorizer 1410 or text categorizer 1500.

At step 1702, potential rules text extracted from a MIG is accessed. For example, text categorizer 1500 receives potential rules text 1502. The potential rules text is used to generate a prompt to an LLM (step 1704) and the prompt is input to the LLM (step 1706). The prompt requests that the LLM categorize whether the potential rules text is rules text of interest for AI-based mapping rule generation. According to one embodiment, the potential rules text is combined with engineered prompt language from a prompt template to generate the prompt to the LLM.

At step 1708, a categorization of the potential rules text is received from the LLM. For example, the LLM returns a result that indicates that the potential rules text is rules text of interest for AI-based mapping rules generation or is not rules text of interest for AI-based mapping rules generation.

FIG. 17 is merely an illustrative example, and the disclosed subject matter is not limited to the ordering or number of steps illustrated. Embodiments may implement additional steps or alternative steps, omit steps, or repeat steps.

Figure 18:
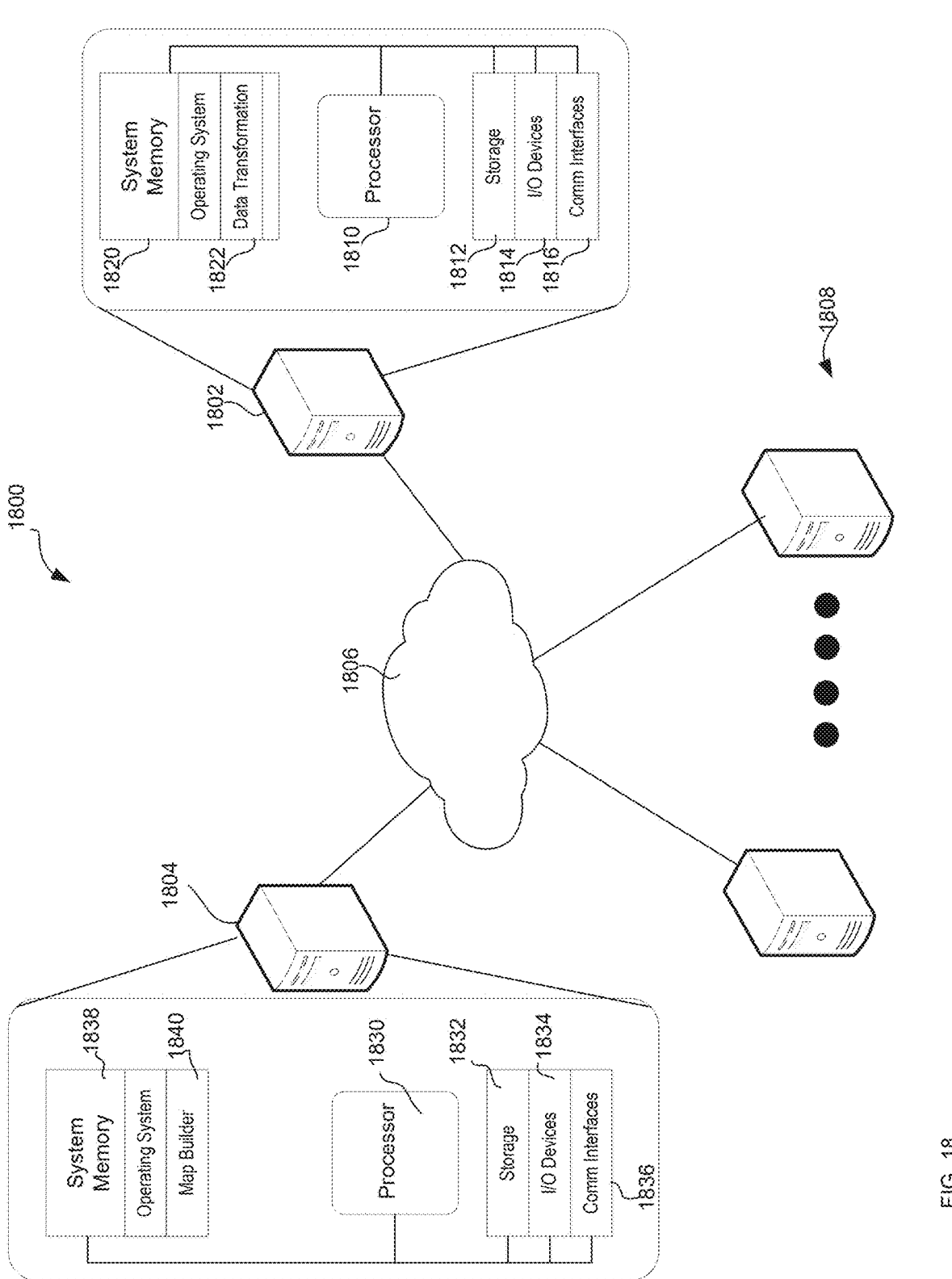
FIG. 18 is a diagrammatic representation of one embodiment of a computing environment that includes a data transformation system connected to a map builder system via network.

FIG. 18 is a diagrammatic representation of one embodiment of a computing environment 1800 that includes a data transformation system 1802 connected to a map builder system 1804 via network 1806. Data transformation system 1802 represents one embodiment of data transformation system 102 and map builder system 1804 represents one embodiment of map builder system 120. Data transformation system 1802 is further connected to a plurality of entity computer systems, such as the computer systems of trading partners, via network 1806. Data transformation system 1802 and map builder system 1804, according to one embodiment, are cloud computing systems. While illustrated separately, data transformation system 1802 and map builder system 1804 may share hardware.

Data transformation system 1802 includes a processor 1810 and memory 1820. Depending on the exact configuration and type of mobile device, memory 1820 (storing, among other things, executable instructions) may be volatile (such as RAM), non-volatile (such as ROM, flash memory, etc.), or some combination of the two. Further, Data transformation system 1802 may also include storage devices 1812, such as, but not limited to, solid state storage. Similarly, data transformation system 1802 may also have input device(s) and output device (I/O devices 1814) such as keyboard, mouse, pen, voice input, touch screen, speakers. Data transformation system 1802 further includes communications interfaces 1816, such as a cellular interface, a Wi-Fi interface, or other interfaces.

Data transformation system 1802 includes at least some form of non-transitory computer-readable media. The non-transitory computer-readable readable media can be any available media that can be accessed by processor 1810 or other devices comprising the operating environment. By way of example, non-transitory computer-readable media may comprise computer storage media such as volatile memory, nonvolatile memory, removable storage, or non-removable storage for storage of information such as computer readable-instructions, data structures, program modules or other data. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

As stated above, a number of program modules and data files may be stored in system memory 1820. While executing on processor 1810, program modules (e.g., applications, Input/Output (I/O) management, and other utilities) may perform processes including, but not limited to, one or more of the stages of the operational methods described with respect to data transformation system 102. In one embodiment, system memory 1820 stores an operating system and a data transformation application 1822. Data transformation application is executable by processor 1810 to transform entity formatted data to/from an intermediate data model to facilitate the interchange of data between entity computer systems 1808. To this end, storage devices 1812 may include a map store, such as map store 114.

System memory 1820 may include other program modules such as program modules to provide analytics or other services. Furthermore, the program modules may be distributed across computer systems in some embodiments.

Map builder system 1804 includes a processor 1830 and memory 1838. Depending on the exact configuration and type of computer system, memory 1838 (storing, among other things, executable instructions) may be volatile (such as RAM), non-volatile (such as ROM, flash memory, etc.), or some combination of the two. Further, map builder system 1804 may also include storage devices 1832. Similarly, map builder system 1804 may also have input device(s) and output device (I/O devices 1834) such as keyboard, mouse, pen, voice input, touch screen, speakers. Map builder system 1804 further includes communications interfaces 1836, such as a cellular interface, a Wi-Fi interface, or other interfaces.

Map builder system 1804 includes at least some form of non-transitory computer-readable media. The non-transitory computer-readable readable media can be any available media that can be accessed by processor 1830 or other devices comprising the operating environment. By way of example, non-transitory computer-readable media may comprise computer storage media such as volatile memory, nonvolatile memory, removable storage, or non-removable storage for storage of information such as computer readable-instructions, data structures, program modules or other data. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

A number of program modules and data files may be stored in system memory 1838. While executing on processor 1830, program modules (e.g., applications, Input/Output (I/O) management, and other utilities) may perform processes including, but not limited to, one or more of the stages of the operational methods described with respect to map builder system 120, map builder 200, AI rules converter 300, AI rules converter 1300, rules text extractor 1400, text categorizer 1500, or response evaluator 400. In one embodiment, system memory 1838 stores an operating system and a map builder application 1840. System memory 1838 may include other program modules such as program modules to provide analytics or other services. Furthermore, the program modules may be distributed across computer systems in some embodiments.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

Portions of the methods described herein may be implemented in suitable software code that may reside within RAM, ROM, a hard drive, or other non-transitory storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods, or programs of embodiments of the invention described herein. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

Particular routines can be executed on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps, and operations described herein can be performed in hardware, software, firmware, or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features, and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A computer-implemented method for artificial intelligence (AI)-assisted mapping of electronic data interchange (EDI) data to an alternative format, the method comprising:

receiving a message implementation guideline (MIG) specifying a first data format for an electronic document for use within an EDI environment, the MIG comprising information associated with electronic data interchange (EDI) components including segments and data elements;

processing the MIG with a trained AI-MIG router that is trained to output a predicted MIG class for the MIG, the trained AI-MIG router trained on a corpus of training data, the corpus of training data comprising examples of a plurality MIG classes;

selecting normalization logic based on the predicted MIG class for the MIG;

converting the MIG from a first MIG format to a normalized MIG using the selected normalization logic, wherein the normalized MIG comprises rules text determined from the information included in the MIG and associated with particular fields in a structured format;

automatically generating a map from the normalized MIG, the map comprising mapping rules for transforming messages formatted according to the MIG to a second data format, wherein generating the map comprises:

generating a prompt to a large language model (LLM), the prompt including the rules text and requesting that the LLM convert the rules text to a respective mapping rule;

inputting the prompt to the LLM;

receiving a response to the prompt, the response comprising an AI-generated mapping rule from the LLM; and adding the AI-generated mapping rule to the map.

2. The computer-implemented method of claim 1, wherein the second data format is a canonical data model format.

3. The computer-implemented method of claim 2, wherein the LLM is tuned with exemplar rules text and exemplar mapping logic according to a data transformation mapping rules language.

4. The computer-implemented method of claim 1, wherein generating the map further comprises:

accessing a rules base comprising predefined mapping rules; and adding a predefined mapping rule that applies to an EDI segment or EDI element referenced in the MIG to the map.

5. The computer-implemented method of claim 4, wherein the predefined mapping rule includes a canonical field name, wherein the AI-generated mapping rule comprises a variable, and wherein the method further comprising:

generating a second prompt to the LLM to match the canonical field name to the variable;

based on a response from the LLM matching the canonical field name to the variable, replacing the variable in the AI-generated rule with the canonical field name.

6. A non-transitory, computer-readable medium storing computer code thereon, the computer code comprising instructions executable by a processor for:

accessing a message implementation guideline (MIG) specifying a first data format for an electronic document for use within an electronic data interchange (EDI) environment, the MIG comprising information associated with electronic data interchange (EDI) components including segments and data elements;

processing the MIG with a trained AI-MIG router that is trained to output a predicted MIG class for the MIG, the trained AI-MIG router trained on a corpus of training data, the corpus of training data comprising examples of a Plurality MIG classes;

selecting normalization logic based on the predicted MIG class for the MIG;

converting the MIG from a first MIG format to a normalized MIG using the selected normalization logic, wherein the normalized MIG comprises rules text determined from the information included in the MIG and associated with particular fields in a structured format;

automatically generating a map from the normalized MIG, the map comprising mapping rules for transforming messages formatted according to the MIG to a second data format, wherein generating the map comprises:

generating a prompt to a large language model (LLM), the prompt including the rules text and requesting that the large language model convert the rules text to respective mapping logic;

inputting the prompt to the LLM;

receiving a response from the LLM, the response comprising an AI-generated mapping rule; and adding the AI-generated mapping rule to the map.

7. The non-transitory, computer-readable medium of claim 6, wherein the second data format is a canonical data model format.

8. The non-transitory, computer-readable medium of claim 6, wherein the LLM is tuned with exemplar rules text and exemplar mapping logic according to a data transformation mapping rules language.

9. The non-transitory, computer-readable medium of claim 6, wherein the stored computer code further comprises instructions for:

wherein generating the map further comprises:

accessing a rules base comprising predefined mapping rules; and adding a predefined mapping rule that applies to an EDI segment or EDI element referenced in the MIG to the map.

10. The non-transitory, computer-readable medium of claim 6, wherein the predefined mapping rule includes a canonical field name, wherein the AI-generated mapping rule comprises a variable, and wherein generating the map further comprises:

generating a second prompt to the LLM to match the canonical field name to the variable;

based on a response from the LLM matching the canonical field name to the variable, replacing the variable in the AI-generated rule with the canonical field name.

11. An electronic document interchange (EDI) system comprising:

computer systems of a plurality of entities;

a data transformation computer system coupled to the computer systems of the plurality of entities, the data transformation computer system comprising:

a data store storing a plurality of data transformation maps, the plurality of data transformation maps automatically generated from message implementation guidelines (MIGs) of the plurality of entities, the data transformation maps comprising data mapping rules for mapping from EDI data formats specified in the MIGs to a canonical data format;

a processor;

a non-transitory, computer-readable medium storing computer code thereon, the computer code comprising instructions executable by the processor for:

receiving a first MIG and an EDI message from a first entity of the plurality of entities, the EDI message destined for a second entity of the plurality of entities, the EDI message including a document of a first document type;

determining a particular format corresponding to the first MIG based on processing the first MIG with a trained AI-MIG router, wherein the AI-MIG router is trained to classify MIGs based on formats of the MIGs to be classified, the trained AI-MIG router being trained on a corpus of training data comprising examples of a plurality MIG classes associated with a plurality of known formats corresponding to a plurality of MIG editing tools;

in response to determining that the particular format of the first MIG corresponds to another format other than the plurality of known formats:

processing the first MIG with an AI-MIG converter to generate a normalized first MIG, wherein the AI-MIG converter is trained to convert new MIG formats to a normalized MIG format, and wherein the normalized first MIG comprises first rules text determined from business logic or first processing data logic included in the first MIG and associated with particular fields in a structured format;

generating a new map for the first entity from the normalized first MIG, wherein generating the new map for the first entity comprises:

generating a prompt to a large language model (LLM), the prompt including the first rules text and requesting that the LLM convert the first rules text to respective first AI-generated mapping logic;

inputting the prompt to the LLM:

receiving the respective first AI-generated mapping logic from the LLM; and adding a first mapping rule to the new map for the first entity, the first mapping rule comprising the respective first AI-generated mapping logic;

selecting a second data transformation map from the plurality of data transformation maps, the second data transformation map associated with the second entity and the first document type and including second data mapping rules, the second data mapping rules comprising a second AI-generated data mapping rule;

executing the first data mapping rules to transform message data from the EDI message from a first EDI message format to the canonical data format;

executing the second data mapping rules to transform the message data from the canonical data format to a second EDI message format; and forwarding the message data to the second entity using the second EDI message format.

12. The system of claim 11, further comprising a rules base comprising predefined mapping rules for EDI segments and EDI elements, wherein generating the new map for the first entity comprises:

identifying from the rules base a predefined mapping rule that applies to an EDI segment or EDI element referenced in the first MIG; and adding the identified predefined mapping rule to the new map for the first entity.

13. The system of claim 12, wherein the predefined mapping rule includes a canonical field name, wherein the respective first AI-generated mapping logic comprises a variable, and wherein generating the new map for the first entity further comprises:

generating a second prompt to the LLM to match the canonical field name to the variable;

based on a response from the LLM matching the canonical field name to the variable, replacing the variable in the respective first AI-generated mapping logic with the canonical field name.

14. The system of claim 11, wherein the LLM is tuned with exemplar rules text and exemplar mapping logic according to a data transformation mapping language.

15. The system of claim 11, where the computer code comprises instructions executable by the processor for:

accessing a second MIG, the second MIG associated with a second entity from the plurality of entities;

automatically generating a new map for the second entity from the second MIG, wherein generating the new map for the second entity comprises:

identifying, from the second MIG, second rules text that contains second business logic or second processing data logic;

generating a second prompt to the LLM, the second prompt including the second rules text and requesting that the LLM convert the second rules text to respective second AI-generated mapping logic;

inputting the second prompt to the LLM;

receiving the respective second AI-generated mapping logic from the LLM; and adding a second mapping rule to the new map for the second entity, the second mapping rule comprising the respective second AI-generated mapping logic.

\* \* \* \* \*